(12) United States Patent
Gan et al.

(10) Patent No.: US 12,323,865 B2
(45) Date of Patent: Jun. 3, 2025

(54) METHOD OF INDICATING CHANGES BY AN ACCESS POINT

(71) Applicant: HUAWEI TECHNOLOGIES CO., LTD., Guangdong (CN)

(72) Inventors: Ming Gan, Shenzhen (CN); Bo Gong, Shenzhen (CN); Yuxin Lu, Shenzhen (CN); Jian Yu, Shenzhen (CN); Yunbo Li, Shenzhen (CN); Mengshi Hu, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 18/317,092

(22) Filed: May 14, 2023

(65) Prior Publication Data

US 2023/0284107 A1   Sep. 7, 2023

Related U.S. Application Data

(63) Continuation of application No. PCT/CN2022/095195, filed on May 26, 2022.

(30) Foreign Application Priority Data

May 26, 2021 (CN) .......................... 202110581012.8
Jul. 20, 2021 (CN) .......................... 202110821657.4

(51) Int. Cl.
*H04W 36/00* (2009.01)
*H04W 76/15* (2018.01)
(Continued)

(52) U.S. Cl.
CPC ... *H04W 36/0069* (2018.08); *H04W 36/0072* (2013.01); *H04W 76/15* (2018.02); *H04W 88/10* (2013.01); *H04W 84/12* (2013.01)

(58) Field of Classification Search
CPC ..... H04W 76/15; H04W 84/12; H04W 48/16; H04W 76/11; H04W 24/02
See application file for complete search history.

(56) References Cited

U.S. PATENT DOCUMENTS

2019/0268956 A1   8/2019   Xiao et al.
2019/0297561 A1   9/2019   Asterjadhi et al.
(Continued)

FOREIGN PATENT DOCUMENTS

CN   108377531 A   8/2018
CN   108738114 A   11/2018
(Continued)

OTHER PUBLICATIONS

IEEE 802.11-20/0337r0, Yongho Seok et al, Multi-link BSS Parameter Update, Jan. 2020, 14 pages.
(Continued)

*Primary Examiner* — Nam T Huynh
(74) *Attorney, Agent, or Firm* — Leydig, Voit & Mayer, Ltd.

(57) ABSTRACT

In a communication method, a first access point (AP) in a first AP multi-link device generates a management frame that includes a capability information field. The capability information field includes first indication information indicating whether a second AP, which is also in the first AP multi-link device, has performed a channel switch. The first AP then sends the management frame to a first station (STA).

8 Claims, 14 Drawing Sheets

(51) Int. Cl.
*H04W 88/10* (2009.01)
*H04W 84/12* (2009.01)

(56) References Cited

U.S. PATENT DOCUMENTS

| | | | |
|---|---|---|---|
| 2020/0221545 | A1 | 7/2020 | Stacey et al. |
| 2020/0351988 | A1 | 11/2020 | Chen et al. |
| 2020/0404737 | A1 | 12/2020 | Cariou et al. |
| 2021/0007168 | A1 | 1/2021 | Asterjadhi et al. |
| 2021/0014911 | A1 | 1/2021 | Patil et al. |
| 2021/0045175 | A1 | 2/2021 | Huang et al. |
| 2021/0051574 | A1 | 2/2021 | Chu et al. |
| 2021/0120612 | A1 | 4/2021 | Park et al. |
| 2022/0174768 | A1* | 6/2022 | Kim .......... H04L 69/24 |
| 2023/0224989 | A1* | 7/2023 | Kim .......... H04W 88/06 370/329 |
| 2023/0284306 | A1* | 9/2023 | Kim .......... H04L 5/0091 370/329 |
| 2024/0008083 | A1* | 1/2024 | Ko .......... H04L 5/0053 |

FOREIGN PATENT DOCUMENTS

| | | |
|---|---|---|
| CN | 111787544 A | 10/2020 |
| CN | 111935800 A | 11/2020 |
| CN | 112449391 A | 3/2021 |
| CN | 112492581 A | 3/2021 |
| CN | 112714472 A | 4/2021 |
| CN | 112788716 A | 5/2021 |
| CN | 112839332 A | 5/2021 |
| CN | 112840725 A | 5/2021 |
| KR | 20210007881 A | 1/2021 |
| RU | 2718111 C2 | 3/2020 |
| TW | 202135587 A | 9/2021 |
| WO | 2022197041 A1 | 9/2022 |

OTHER PUBLICATIONS

IEEE 802.11-20/0337r1, Yongho Seok et al, Multi-link BSS Parameter Update, May 2020, 14 pages.

IEEE Std 802.11-2016, IEEE Standard for Information technology—Telecommunications and information exchange between systems Local and metropolitan area networks—Specific requirements, Part 11: Wireless LAN Medium Access Control (MAC) and Physical Layer (PHY) Specifications, Approved Dec. 7, 2016, total 3534 pages.

IEEE 802.11-20/0503-01-00be, Ming Gan et al, BSS parameter update for Multi-link Operation, Apr. 2020, 13 pages.

IEEE P802.11ax/D8.0, Oct. 2020, Draft Standard for Information technology—Tele-communications and information exchange between systems Local and metropolitan area networks—Specific requirements, Part 11: Wireless LAN Medium Access Control (MAC) and Physical Layer (PHY) Specifications, Amendment 1: Enhancements for High EfficiencyWLAN, 820 pages.

Ming Gan et al, TBD and CR for BSS parameter critical update procedure, Mar. 20, 2021, IEEE 802.11-21/0621r1, 12 Pages.

Payam Torab et al, Comment resolution for ML Reconfiguration, IEEE 802.11-21/534r1, May 16, 2021, 16 pages.

802 11 Working Group of the LAN/MAN StandardsCommittee of the IEEE Computer Society: "Draft Standard forInformation technology—Telecommunications and information exchangebetween systems Local and metropolitan area networks—Specificrequirements Part 11:Wireless LAN MediumAccess Control?(MAC) andPhysical Layer (PHY) Specifications Amendment 8: Enhancements forextre",IEEE Draft; Draft P802.11 BE_D1.0, IEEE-SA, Piscataway, NJUSA,vol. 802.11 be drafts, No. D1.0 May 24, 2021 (May 24, 2021), pp. 1-635,XP068183460.

Kwon Young Hoon et al: "Critical Update-Follow Up",IEEE 802. 11-21/0262R0, Feb. 17, 2021 (Feb. 17, 2021), pp. 1-9,XP055967354.

Patil Abhishek et al: "MLO Indication of Critical Updates", Apr. 15, 2020(Apr. 15, 2020), pp. 1-17, XP093137820.

802 11 Working Group of the LAN/MAN StandardsCommittee of the IEEE Computer Society: IEEE Draft; Draft P802.11 BE_D4.1 IEEE-SA, Piscataway, NJUSA,vol. 802.11 be drafts, No. D4.1 Sep. 22, 2023 (Sep. 22, 2023), pp. 1-1045, XP068202981.

"IEEE Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications," IEEE Std 802.11 (Revision of IEEE Std 802.11-2016), Total 4379 Pages, Institute of Electrical and Electronics Engineers, New York, New York (Dec. 2020).

Kim et al., "Clarification on BSS parameter update," doc.: IEEE 802.11-21/0036r0 [online], Total 12 pages, Institute of Electrical and Electronics Engineers, New York, New York (Jan. 2021).

Patil et al., "MLO Indication of Critical Updates," doc.: IEEE 802.11-20/0586r5 [online], Total 20 pages, Institute of Electrical and Electronics Engineers, New York, New York (Apr. 2020).

\* cited by examiner

| Element ID | Length | Maximum BSSID indicator | Optional subelement |
|---|---|---|---|
| 1 byte | 1 byte | 6 bytes | Variable |

Element ID: element identifier
BSSID: basic service set identifier

FIG. 1

| Element number | Length | Channel switch mode | New channel number New channel number | Channel switch count Channel switch count |
|---|---|---|---|---|

(a)

| Element number | Length | Channel switch mode | New operating class New operating class | New channel number New channel number | Channel switch count Channel switch count |
|---|---|---|---|---|---|

METHOD OF INDICATING CHANGES BY AN ACCESS POINT

CROSS-REFERENCE TO RELATED APPLICATIONS

This application is a continuation of International Application PCT/CN2022/095195, filed on May 26, 2022, which claims priority to Chinese Patent Application 202110581012.8, filed on May 26, 2021, and Chinese Patent Application 202110821657.4, filed on Jul. 20, 2021. All of the aforementioned priority patent applications are hereby incorporated by reference in their entirety.

TECHNICAL FIELD

This application relates to the field of communication technologies, and in particular, to a communication method and apparatus.

BACKGROUND

In an existing wireless local area network (WLAN) communication system, a multi-link device that can support concurrent communication on multiple links is provided to improve transmission efficiency. The multi-link device may include one or more stations. When the station is an access point (AP), the multi-link device may be referred to as an AP multi-link device. When the station is a non-access-point station (non-AP STA), the non-AP STA may also be briefly described as a STA, and the multi-link device may also be referred to as a STA multi-link device.

For each AP, based on a basic service set identifier (BSSID), an AP whose BSSID is a transmitted BSSID may be referred to as a transmitted AP, and an AP whose BSSID is a non-transmitted BSSID may be referred to as a non-transmitted AP.

Currently, when a STA associated with an AP in an AP multi-link device is in a doze state, where the STA belongs to a non-AP multi-link device, and the AP is performing a channel switch (in this case, a beacon frame sent by the AP on a link on which the AP operates carries an element related to the channel switch; or if the AP is a non-transmitted BSSID AP in a multiple BSSID set, a beacon frame sent by a transmitted AP corresponding to the AP carries the element related to the channel switch of the AP), another AP from the same AP multi-link device (if the AP is a non-transmitted BSSID AP in the multiple BSSID set, the other AP is the transmitted AP in the multiple BSSID set) may carry the element related to the channel switch of the AP in a management frame. A STA (belonging to the same non-AP multi-link device as the STA associated with the AP) associated with the other AP learns that the AP is performing the channel switch. Therefore, the STA belonging to the same non-AP multi-link device learns the information.

However, if the AP has performed the channel switch before the other AP belonging to the same AP multi-link device sends the management frame, the other AP (or may be described as a reporting AP) does not carry the element related to the channel switch of the AP. In other words, the non-AP multi-link device cannot learn that the AP has performed the channel switch.

SUMMARY

In view of this, embodiments of this application provide a communication method and apparatus, to resolve a technical problem that a transmitted AP does not carry a parameter element of an AP if the AP has performed a channel switch before the transmitted AP sends a management frame and therefore a STA associated with the AP cannot learn that the AP has performed the channel switch.

According to a first aspect, an embodiment of this application provides a communication method. The method includes: A first access point AP generates a management frame. The management frame includes a capability information field. The capability information field includes first indication information. The first indication information indicates whether another AP in a first AP multi-link device has performed a channel switch. The first AP multi-link device includes the first AP. The first AP sends the management frame to a first station STA.

Based on the first aspect, when sending the management frame, the first AP may carry the first indication information to indicate whether the other AP in the first AP multi-link device has performed the channel switch. In this way, the first STA that is associated with the first AP and belongs to a non-AP MLD determines, based on the first indication information, whether the other AP in the first AP multi-link device has performed the channel switch. If the other AP in the first AP multi-link device has performed the channel switch, the STA obtains channel switch information of the AP that has performed the channel switch. Therefore, a STA (even if the STA is in a doze state) that belongs to the same non-AP MLD and that is associated with the AP that has performed the channel switch learns that the AP associated with the STA has performed the channel switch and learns of the channel switch information after the channel switch.

In a possible design, the capability information field further includes first critical update flag signaling. The first critical update flag signaling indicates whether a critical parameter update value of an AP in the first AP multi-link device changes. A value of the first critical update flag signaling is irrelevant to whether a management frame sent by an AP in the first AP multi-link device includes an element related to a channel switch, or a management frame sent by an AP in the first AP multi-link device does not include an element related to a channel switch.

Based on this possible design, for the first AP multi-link device, a value of a critical parameter update value of an AP does not change regardless of whether a management frame sent by the AP includes an element related to a channel switch. In other words, a value of the first critical update flag signaling does not change regardless of whether a management frame sent by an AP includes an element related to a channel switch.

In a possible design, when any event in a critical basic service set BSS parameter event corresponding to an AP in the first AP multi-link device occurs, the first AP adjusts a value of a critical parameter update value of the AP.

In a possible design, the critical BSS parameter event includes at least one of the following events: an enhanced distributed channel access EDCA parameter element is modified, a direct sequence spread spectrum DSSS parameter set element is modified, a high throughput HT operation element is modified, a wide bandwidth channel switch element is included, a wide bandwidth channel switch wrapper element is included, an operating mode notification element is included, a very high throughput VHT operation element is modified, a high efficient HE operation element is modified, a broadcast target wake time TWT element is inserted, a BSS color change announcement element is included, a multi-user MU EDCA parameter set element is modified, a spatial multiplexing parameter set element is modified, and an extremely high throughput EHT operation element is modified.

In a possible design, the critical BSS parameter event does not include any one of the following events: A channel switch announcement element is included, an extended channel switch announcement element is included, a quiet element is included, and a quiet channel element is included.

Based on the foregoing three possible designs, compared with the 802.11ax standard, events that a channel switch announcement element is included, that an extended channel switch announcement element is included, that a quiet element is included, and that a quiet channel element is included are removed from the critical BSS parameter events. In this way, a STA multi-link device associated with the first AP multi-link device does not obtain repeated elements related to the channel switch of the AP based on the RNR element and the multi-link element in the management frame. This reduces power consumption of the STA multi-link device and saves air interface transmission opportunities.

In a possible design, the management frame further includes a non-transmitted basic service set identifier BSSID field. The non-transmitted BSSID field includes second indication information, and the second indication information indicates whether another AP in the second AP multi-link device has performed a channel switch. At least one AP in the second AP multi-link device and the first AP belong to a same multiple BSSID set. The non-transmitted BSSID field is in a non-transmitted BSSID capability element in a non-transmitted BSSID profile sub-element in a multiple BSSID element. The non-transmitted BSSID field may alternatively be referred to as a non-transmitted BSSID capability field, or may have another name.

Based on this possible design, when sending the management frame, the first AP may carry the second indication information to indicate whether the other AP in the second AP multi-link device has performed the channel switch. In this way, the first STA that is associated with the first AP and belongs to a non-AP MLD determines, based on the second indication information, whether the other AP in the second AP multi-link device has performed the channel switch. If the other AP in the second AP multi-link device has performed the channel switch, the STA obtains channel switch information of the AP that has performed the channel switch. Therefore, a STA (even if the STA is in a doze state) that belongs to the same non-AP MLD and that is associated with the AP that has performed the channel switch learns that the AP associated with the STA has performed the channel switch and learns of the channel switch information after the channel switch.

In a possible design, the non-transmitted BSSID field includes second critical update flag signaling, where the second critical update flag signaling indicates whether a critical parameter update value of an AP in the second AP multi-link device changes. A value of the second critical update flag signaling is irrelevant to whether a management frame sent by an AP in the second AP multi-link device includes an element related to a channel switch, or a management frame sent by an AP in the second AP multi-link device does not include an element related to a channel switch.

Based on this possible design, for the second AP multi-link device, a value of a critical parameter update value of an AP does not change regardless of whether a management frame sent by the AP includes an element related to a channel switch. In other words, a value of the second critical update flag signaling does not change regardless of whether a management frame sent by an AP includes an element related to a channel switch.

In a possible design, when any event in a critical BSS parameter event corresponding to an AP in the second AP multi-link device occurs, the first AP adjusts a value of a critical parameter update value of the AP.

Based on this possible design, compared with the 802.11ax standard, events that a channel switch announcement element is included, that an extended channel switch announcement element is included, that a quiet element is included, and that a quiet channel element is included are removed from the critical BSS parameter events. In this way, a STA multi-link device associated with the first AP multi-link device does not obtain repeated elements related to the channel switch of the AP based on the RNR element and the multi-link element in the management frame. This reduces power consumption of the STA multi-link device and saves air interface transmission opportunities.

According to a second aspect, an embodiment of this application provides a first AP. The first AP may implement a function performed by the first AP in the first aspect or the possible designs of the first aspect, and the function may be implemented by hardware executing corresponding software. The hardware or the software includes one or more modules corresponding to the functions, for example, a processing module and a transceiver module. The processing module is configured to generate a management frame. The management frame includes a capability information field. The capability information field includes first indication information, and the first indication information indicates whether another AP in the first AP multi-link device has performed a channel switch. The first AP multi-link device includes the first AP. The transceiver module is configured to send the management frame to the first station STA.

In a possible design, the capability information field further includes first critical update flag signaling. The first critical update flag signaling indicates whether a critical parameter update value of an AP in the first AP multi-link device changes. A value of the first critical update flag signaling is irrelevant to whether a management frame sent by an AP in the first AP multi-link device includes an element related to a channel switch, or a management frame sent by an AP in the first AP multi-link device does not include an element related to a channel switch.

In a possible design, the processing module is further configured to: when any event in a critical basic service set BSS parameter event corresponding to an AP in the first AP multi-link device occurs, adjust a value of a critical parameter update value of the AP.

In a possible design, the critical BSS parameter event includes at least one of the following events: an enhanced distributed channel access EDCA parameter element is modified, a direct sequence spread spectrum DSSS parameter set element is modified, a high throughput HT operation element is modified, a wide bandwidth channel switch element is included, a wide bandwidth channel switch wrapper element is included, an operating mode notification element is included, a very high throughput VHT operation element is modified, a high efficient HE operation element is modified, a broadcast target wake time TWT element is inserted, a BSS color change announcement element is included, a multi-user MU EDCA parameter set element is modified, a spatial multiplexing parameter set element is modified, and an extremely high throughput EHT operation element is modified.

In a possible design, the critical BSS parameter event does not include any one of the following events: A channel switch announcement element is included, an extended channel switch announcement element is included, a quiet element is included, and a quiet channel element is included.

In a possible design, the management frame further includes a non-transmitted basic service set identifier BSSID field. The non-transmitted BSSID field includes second indication information, and the second indication information indicates whether another AP in a second AP multi-link device has performed a channel switch. At least one AP in the second AP multi-link device and the first AP belong to a same multiple BSSID set.

In a possible design, the non-transmitted BSSID field includes second critical update flag signaling, where the second critical update flag signaling indicates whether a critical parameter update value of an AP in the second AP multi-link device changes. A value of the second critical update flag signaling is irrelevant to whether a management frame sent by an AP in the second AP multi-link device includes an element related to a channel switch, or a management frame sent by an AP in the second AP multi-link device does not include an element related to a channel switch.

In a possible design, the processing module is further configured to: when any event in a critical BSS parameter event corresponding to an AP in the second AP multi-link device occurs, adjust a value of a critical parameter update value of the AP.

It should be noted that, for a specific implementation of the first AP in the second aspect, refer to behavior functions of the first AP in the communication method provided in any one of the first aspect or the possible designs of the first aspect.

According to a third aspect, an embodiment of this application provides a first AP. The first AP may be the first AP or a chip or a system-on-a-chip in the first AP. The first AP may implement functions performed by the first AP in the foregoing aspects or the possible designs, and the functions may be implemented by hardware. In a possible design, the first AP may include a processor and a transceiver. The processor and the transceiver may be configured to support the first AP in implementing the functions in any one of the first aspect or the possible designs of the first aspect. For example, the processor may be configured to generate a management frame. The management frame includes a capability information field, the capability information field includes first indication information, and the first indication information indicates whether another AP in the first AP multi-link device has performed a channel switch. The first AP multi-link device includes the first AP. The transceiver may be configured to send the management frame to a first station STA. In still another possible design, the first AP may further include a memory. The memory is configured to store computer-executable instructions and data that are necessary for the first AP. When the first AP runs, the transceiver and the processor execute the computer-executable instructions stored in the memory, so that the first AP performs the communication method according to any one of the first aspect or the possible designs of the first aspect.

For a specific implementation of the first AP in the third aspect, refer to behavior functions of the first AP in the communication method provided in any one of the first aspect or the possible designs of the first aspect.

According to a fourth aspect, an embodiment of this application provides a communication method. The method includes: A first station STA receives a management frame from a first access point AP. The management frame includes a capability information field. The capability information field includes first indication information, and the first indication information indicates whether another AP in a first AP multi-link device has performed a channel switch. The first AP multi-link device includes the first AP, and the STA multi-link device includes the first STA. When the first indication information indicates that the other AP in the first AP multi-link device has performed the channel switch, the first STA obtains channel switch information of the AP that performs the channel switch, so that in the STA multi-link device, a STA associated with the AP that has performed the channel switch obtains the channel switch information.

Based on the fourth aspect, when sending the management frame, the first AP may carry the first indication information to indicate whether the other AP in the first AP multi-link device has performed the channel switch. In this way, the first STA that is associated with the first AP and belongs to a non-AP MLD determines, based on the first indication information, whether the other AP in the first AP multi-link device has performed the channel switch. If the other AP in the first AP multi-link device has performed the channel switch, the STA obtains channel switch information of the AP that has performed the channel switch. Therefore, a STA (even if the STA is in a doze state) that belongs to the same non-AP MLD and that is associated with the AP that has performed the channel switch learns that the AP associated with the STA has performed the channel switch and learns of the channel switch information after the channel switch.

In a possible design, the capability information field further includes first critical update flag signaling. The first critical update flag signaling indicates whether a critical parameter update value of an AP in the first AP multi-link device changes. A value of the first critical update flag signaling is irrelevant to whether a management frame sent by an AP in the first AP multi-link device includes an element related to a channel switch, or a management frame sent by an AP in the first AP multi-link device does not include an element related to a channel switch.

Based on this possible design, for the first AP multi-link device, a value of a critical parameter update value of an AP does not change regardless of whether a management frame sent by the AP includes an element related to a channel switch. In other words, a value of the first critical update flag signaling does not change regardless of whether a management frame sent by an AP includes an element related to a channel switch.

In a possible design, a value of a critical parameter update value of an AP in the first AP multi-link device is adjusted based on occurrence of any event in a critical basic service set BSS parameter event corresponding to the AP.

In a possible design, the critical BSS parameter event includes at least one of the following events: an enhanced distributed channel access EDCA parameter element is modified, a direct sequence spread spectrum DSSS parameter set element is modified, a high throughput HT operation element is modified, a wide bandwidth channel switch element is included, a wide bandwidth channel switch wrapper element is included, an operating mode notification element is included, a very high throughput VHT operation element is modified, a high efficient HE operation element is modified, a broadcast target wake time TWT element is inserted, a BSS color change announcement element is included, a multi-user MU EDCA parameter set element is modified, a spatial multiplexing parameter set element is modified, and an extremely high throughput EHT operation element is modified.

In a possible design, the critical BSS parameter event does not include any one of the following events: A channel switch announcement element is included, an extended channel switch announcement element is included, a quiet element is included, and a quiet channel element is included.

Based on the foregoing three possible designs, compared with the 802.11ax standard, events that a channel switch announcement element is included, that an extended channel switch announcement element is included, that a quiet element is included, and that a quiet channel element is included are removed from the critical BSS parameter events. In this way, a STA multi-link device associated with the first AP multi-link device does not obtain repeated elements related to the channel switch of the AP based on the RNR element and the multi-link element in the management frame. This reduces power consumption of the STA multi-link device and saves air interface transmission opportunities.

In a possible design, the management frame further includes a non-transmitted basic service set identifier BSSID field. The non-transmitted BSSID field includes second indication information, and the second indication information indicates whether another AP in a second AP multi-link device has performed a channel switch. At least one AP in the second AP multi-link device and the first AP belong to a same multiple BSSID set.

In a possible design, when the second indication information indicates that an AP in the second AP multi-link device has performed a channel switch, the first STA obtains channel switch information of the AP that has performed the channel switch, so that in the STA multi-link device, a STA associated with the AP that has performed the channel switch obtains the channel switch information.

Based on the foregoing two possible designs, when sending the management frame, the first AP may carry the second indication information to indicate whether the other AP in the second AP multi-link device has performed the channel switch. In this way, the first STA that is associated with the first AP and belongs to a non-AP MLD determines, based on the second indication information, whether the other AP in the second AP multi-link device has performed the channel switch. If the other AP in the second AP multi-link device has performed the channel switch, the STA obtains channel switch information of the AP that has performed the channel switch. Therefore, a STA (even if the STA is in a doze state) that belongs to the same non-AP MLD and that is associated with the AP that has performed the channel switch learns that the AP associated with the STA has performed the channel switch and learns of the channel switch information after the channel switch.

In a possible design, the non-transmitted BSSID field includes second critical update flag signaling, where the second critical update flag signaling indicates whether a critical parameter update value of an AP in the second AP multi-link device changes. A value of the second critical update flag signaling is irrelevant to whether a management frame sent by an AP in the second AP multi-link device includes an element related to a channel switch, or a management frame sent by an AP in the second AP multi-link device does not include an element related to a channel switch.

Based on this possible design, for the second AP multi-link device, a value of a critical parameter update value of an AP does not change regardless of whether a management frame sent by the AP includes an element related to a channel switch. In other words, a value of the second critical update flag signaling does not change regardless of whether a management frame sent by an AP includes an element related to a channel switch.

In a possible design, a value of a critical parameter update value of an AP in the second AP multi-link device is adjusted based on occurrence of any one of a critical BSS parameter event corresponding to the AP.

Based on this possible design, compared with the 802.11ax standard, events that a channel switch announcement element is included, that an extended channel switch announcement element is included, that a quiet element is included, and that a quiet channel element is included are removed from the critical BSS parameter events. In this way, a STA multi-link device associated with the first AP multi-link device does not obtain repeated elements related to the channel switch of the AP based on the RNR element and the multi-link element in the management frame. This reduces power consumption of the STA multi-link device and saves air interface transmission opportunities.

According to a fifth aspect, an embodiment of this application provides a first STA. The first STA may implement a function performed by the first STA in the fourth aspect or the possible designs of the fourth aspect, and the function may be implemented by hardware executing corresponding software. The hardware or the software includes one or more modules corresponding to the functions, for example, a transceiver module and a processing module. The transceiver module is configured to receive a management frame from a first access point AP. The management frame includes a capability information field. The capability information field includes first indication information, and the first indication information indicates whether another AP in a first AP multi-link device has performed a channel switch. The first AP multi-link device includes the first AP, and the STA multi-link device includes the first STA. When the first indication information indicates that the other AP in the first AP multi-link device has performed the channel switch, the processing module is configured to obtain channel switch information of the AP that performs the channel switch, so that in the STA multi-link device, a STA associated with the AP that has performed the channel switch obtains the channel switch information.

In a possible design, the capability information field further includes first critical update flag signaling. The first critical update flag signaling indicates whether a critical parameter update value of an AP in the first AP multi-link device changes. A value of the first critical update flag signaling is irrelevant to whether a management frame sent by an AP in the first AP multi-link device includes an element related to a channel switch, or a management frame sent by an AP in the first AP multi-link device does not include an element related to a channel switch.

In a possible design, a value of the critical parameter update value of the AP in the first AP multi-link device is adjusted based on occurrence of any event in a critical basic service set BSS parameter event corresponding to the AP.

In a possible design, the critical BSS parameter event includes at least one of the following events: an enhanced distributed channel access EDCA parameter element is modified, a direct sequence spread spectrum DSSS parameter set element is modified, a high throughput HT operation element is modified, a wide bandwidth channel switch element is included, a wide bandwidth channel switch wrapper element is included, an operating mode notification element is included, a very high throughput VHT operation element is modified, a high efficient HE operation element is modified, a broadcast target wake time TWT element is inserted, a BSS color change announcement element is included, a multi-user MU EDCA parameter set element is modified, a spatial multiplexing parameter set element is modified, and an extremely high throughput EHT operation element is modified.

In a possible design, the critical BSS parameter event does not include any one of the following events: A channel switch announcement element is included, an extended channel switch announcement element is included, a quiet element is included, and a quiet channel element is included.

In a possible design, the management frame further includes a non-transmitted basic service set identifier BSSID field. The non-transmitted BSSID field includes second indication information, and the second indication information indicates whether another AP in a second AP multi-link device has performed a channel switch. At least one AP in the second AP multi-link device and the first AP belong to a same multiple BSSID set.

In a possible design, when the second indication information indicates that an AP in the second AP multi-link device has performed a channel switch, the processing module is further configured to obtain channel switch information of the AP that has performed the channel switch, so that in the STA multi-link device, a STA associated with the AP that has performed the channel switch obtains the channel switch information.

In a possible design, the non-transmitted BSSID field includes second critical update flag signaling, where the second critical update flag signaling indicates whether a critical parameter update value of an AP in the second AP multi-link device changes. A value of the second critical update flag signaling is irrelevant to whether a management frame sent by an AP in the second AP multi-link device includes an element related to a channel switch, or a management frame sent by an AP in the second AP multi-link device does not include an element related to a channel switch.

In a possible design, a value of a critical parameter update value of an AP in the second AP multi-link device is adjusted based on occurrence of any one of a critical BSS parameter event corresponding to the AP.

It should be noted that for a specific implementation of the first STA in the fifth aspect, refer to behavior functions of the first STA in the communication method provided in any one of the fourth aspect or the possible designs of the fourth aspect.

According to a sixth aspect, an embodiment of this application provides a first STA. The first STA may be the first STA or a chip or a system-on-a-chip in the first STA. The first STA may implement functions performed by the first STA in the foregoing aspects or the possible designs, and the functions may be implemented by hardware. In a possible design, the first STA may include a transceiver and a processor. The transceiver and the processor may be configured to support the first STA in implementing the function in any one of the fourth aspect or the possible designs of the fourth aspect. For example, the transceiver is configured to receive a management frame from a first access point AP. The management frame includes a capability information field. The capability information field includes first indication information, and the first indication information indicates whether another AP in a first AP multi-link device has performed a channel switch. The first AP multi-link device includes the first AP, and the STA multi-link device includes the first STA. When the first indication information indicates that the other AP in the first AP multi-link device has performed the channel switch, the processor is configured to obtain channel switch information of the AP that performs the channel switch, so that in the STA multi-link device, a STA associated with the AP that has performed the channel switch obtains the channel switch information. In still another possible design, the first STA may further include a memory. The memory is configured to store computer-executable instructions and data that are necessary for the first STA. When the first STA runs, the transceiver and the processor execute the computer-executable instructions stored in the memory, so that the first STA performs the communication method according to any one of the fourth aspect or the possible designs of the fourth aspect.

For a specific implementation of the first STA in the sixth aspect, refer to behavior functions of the first STA in the communication method provided in any one of the fourth aspect or the possible designs of the fourth aspect.

According to a seventh aspect, an embodiment of this application provides a communication method. The method includes: A first access point AP generates a management frame, where after an AP in a first AP multi-link device performs a channel switch, the management frame includes an ML element, the ML element includes channel switch information of the AP that has performed the channel switch, and the ML element is up to a next delivery traffic indication map (DTIM) beacon frame sent by the first AP. The first AP multi-link device includes the first AP. The first AP sends the management frame to a first station STA.

Based on the seventh aspect, when the first AP sends the management frame, the channel switch information of the AP, in the first AP multi-link device, that has performed the channel switch may be indicated by carrying the channel switch information in the ML element. In this way, the first STA associated with the first AP determines, based on the ML element, the channel switch information of the AP that has performed the channel switch, and a STA associated with the AP that has performed the channel switch learns that has the AP associated with the STA has performed the channel switch, and learns of the channel switch information after the channel switch.

In a possible design, after an AP in a second AP multi-link device performs a channel switch, the ML element further includes channel switch information of the AP that has performed the channel switch and that is in the second AP multi-link device, and the ML element is up to a next DTIM beacon frame sent by the first AP, where at least one AP in the second AP multi-link device and the first AP belong to a same multiple BSSID set.

Based on this possible design, when the first AP sends the management frame, the channel switch information of the AP, in the second AP multi-link device, that has performed the channel switch may be further indicated. In this way, the first STA associated with the first AP determines, based on the ML element, the channel switch information of the AP that has performed the channel switch, and a STA associated with the AP that has performed the channel switch learns that has the AP associated with the STA has performed the channel switch, and learns of the channel switch information after the channel switch.

In a possible design, the channel switch information includes an element related to the channel switch; or the channel switch information includes a changed operating class and a changed channel number of the AP; or the channel switch information includes a changed channel number of the AP.

Based on this possible design, the channel switch information may include the element related to the channel switch, or may include the changed operating class and the changed channel number of the AP. This is not limited.

In a possible design, the management frame further includes a channel switch count field. When a value of the channel switch count field is a first value, the channel switch count field indicates that a channel switch occurs immediately before a next target beacon transmission time; or when a value of the channel switch count field is a second value, the channel switch count field indicates that a channel switch occurs at any time after the management frame is sent or that a channel switch has occurred.

Based on the foregoing possible design, different from the 802.11ax standard, when an AP in the first AP multi-link device has performed a channel switch, and after the AP completes the channel switch, when the first AP sends a management frame, channel switch information of the AP that has performed the channel switch is still carried in the ML element of the management frame until a next DTIM beacon frame, so that a STA in the STA multi-link device learns of the channel switch information of the AP that has performed the channel switch. In this case, the value of the channel switch count field may be the second value, to indicate that the channel switch occurs at any time after the management frame is sent or that the channel switch has occurred.

According to an eighth aspect, an embodiment of this application provides a first AP. The first AP may implement a function performed by the first AP in the seventh aspect or the possible designs of the seventh aspect, and the function may be implemented by hardware executing corresponding software. The hardware or the software includes one or more modules corresponding to the functions, for example, a processing module and a transceiver module. The processing module is configured to generate a management frame, where after an AP in a first AP multi-link device performs a channel switch, the management frame includes an ML element, the ML element includes channel switch information of the AP that has performed the channel switch, and the ML element is up to a next delivery traffic indication map DTIM beacon frame sent by the first AP. The first AP multi-link device includes the first AP. The transceiver module is configured to send the management frame to a first station STA.

In a possible design, after an AP in a second AP multi-link device performs a channel switch, the ML element further includes channel switch information of the AP that has performed the channel switch and that is in the second AP multi-link device, and the ML element is up to a next DTIM beacon frame sent by the first AP, where at least one AP in the second AP multi-link device and the first AP belong to a same multiple BSSID set.

In a possible design, the channel switch information includes an element related to the channel switch; or the channel switch information includes a changed operating class and a changed channel number of the AP; or the channel switch information includes a changed channel number of the AP.

In a possible design, the management frame further includes a channel switch count field. When a value of the channel switch count field is a first value, the channel switch count field indicates that a channel switch occurs immediately before a next target beacon transmission time; or when a value of the channel switch count field is a second value, the channel switch count field indicates that a channel switch occurs at any time after the management frame is sent or that a channel switch has occurred.

It should be noted that, for a specific implementation of the first AP in the eighth aspect, refer to behavior functions of the first AP in the communication method provided in any one of the seventh aspect or the possible designs of the seventh aspect.

According to a ninth aspect, an embodiment of this application provides a first AP. The first AP may be the first AP or a chip or a system-on-a-chip in the first AP. The first AP may implement functions performed by the first AP in the foregoing aspects or the possible designs, and the functions may be implemented by hardware. In a possible design, the first AP may include a processor and a transceiver. The processor is configured to generate a management frame, where after an AP in a first AP multi-link device performs a channel switch, the management frame includes an ML element, the ML element includes channel switch information of the AP that has performed the channel switch, and the ML element is up to a next delivery traffic indication map DTIM beacon frame sent by the first AP. The first AP multi-link device includes the first AP. The transceiver module is configured to send the management frame to a first station STA. In still another possible design, the first AP may further include a memory. The memory is configured to store computer-executable instructions and data that are necessary for the first AP. When the first AP runs, the transceiver and the processor execute the computer-executable instructions stored in the memory, so that the first AP performs the communication method according to any one of the seventh aspect or the possible designs of the seventh aspect.

For a specific implementation of the first AP in the ninth aspect, refer to behavior functions of the first AP in the communication method provided in any one of the seventh aspect or the possible designs of the seventh aspect.

According to a tenth aspect, an embodiment of this application provides a communication method. The method includes: A first station STA receives a management frame from a first access point AP. The management frame includes an ML element, the ML element includes channel switch information of an AP, in a first AP multi-link device, that has performed a channel switch, and the ML element is up to that the first STA receives a next delivery traffic indication map DTIM beacon frame sent by the first AP. The first AP multi-link device includes the first AP; and the STA multi-link device includes the first STA. The first STA obtains the channel switch information based on the ML element, so that a STA that is in the STA multi-link device and that is associated with the AP that has performed the channel switch obtains the channel switch information.

Based on the tenth aspect, when the first AP sends the management frame, the channel switch information of the AP, in the first AP multi-link device, that has performed the channel switch may be indicated by carrying the channel switch information in the ML element. In this way, the first STA associated with the first AP determines, based on the ML element, the channel switch information of the AP that has performed the channel switch, and a STA associated with the AP that has performed the channel switch learns that has the AP associated with the STA has performed the channel switch, and learns of the channel switch information after the channel switch.

In a possible design, the ML element further includes channel switch information of an AP that has performed a channel switch and that is in a second AP multi-link device, and the ML element is up to that the first STA receives a next delivery traffic indication map DTIM beacon frame sent by the first AP, where at least one AP in the second AP multi-link device and the first AP belong to a same multiple BSSID set.

Based on this possible design, when the first AP sends the management frame, the channel switch information of the AP, in the second AP multi-link device, that has performed the channel switch may be further indicated. In this way, the first STA associated with the first AP determines, based on the ML element, the channel switch information of the AP that has performed the channel switch, and a STA associated with the AP that has performed the channel switch learns that has the AP associated with the STA has performed the channel switch, and learns of the channel switch information after the channel switch.

In a possible design, the channel switch information includes an element related to the channel switch; or the channel switch information includes a changed operating class and a changed channel number of the AP; or the channel switch information includes a changed channel number of the AP.

Based on this possible design, the channel switch information may include the element related to the channel switch, or may include the changed operating class and the changed channel number of the AP. This is not limited.

In a possible design, the management frame further includes a channel switch count field. When a value of the channel switch count field is a third value, the channel switch count field indicates that a channel switch occurs immediately before a next target beacon transmission time; or when a value of the channel switch count field is a fourth value, the channel switch count field indicates that a channel switch occurs at any time after the management frame is sent or that a channel switch has occurred.

Based on the foregoing possible design, different from the 802.11ax standard, when an AP in the first AP multi-link device has performed a channel switch, and after the AP completes the channel switch, when the first AP sends a management frame, channel switch information of the AP that has performed the channel switch is still carried in the ML element of the management frame until a next DTIM beacon frame, so that a STA in the STA multi-link device learns of the channel switch information of the AP that has performed the channel switch. In this case, the value of the channel switch count field may be the second value, to indicate that the channel switch occurs at any time after the management frame is sent or that the channel switch has occurred.

According to an eleventh aspect, an embodiment of this application provides a first STA. The first STA may implement a function performed by the first STA in the tenth aspect or the possible designs of the tenth aspect, and the function may be implemented by hardware executing corresponding software. The hardware or the software includes one or more modules corresponding to the functions, for example, a transceiver module and a processing module. The transceiver module is configured to receive a management frame from a first access point AP. The management frame includes an ML element, the ML element includes channel switch information of an AP, in a first AP multi-link device, that has performed a channel switch, and the ML element is up to that the first STA receives a next delivery traffic indication map DTIM beacon frame sent by the first AP. The first AP multi-link device includes the first AP; and the STA multi-link device includes the first STA. The processing module is configured to obtain the channel switch information based on the ML element, so that a STA that is in the STA multi-link device and that is associated with the AP that has performed the channel switch obtains the channel switch information.

In a possible design, the ML element further includes channel switch information of an AP that has performed a channel switch and that is in a second AP multi-link device, and the ML element is up to that the first STA receives a next delivery traffic indication map DTIM beacon frame sent by the first AP, where at least one AP in the second AP multi-link device and the first AP belong to a same multiple BSSID set.

In a possible design, the channel switch information includes an element related to the channel switch; or the channel switch information includes a changed operating class and a changed channel number of the AP; or the channel switch information includes a changed channel number of the AP.

In a possible design, the management frame further includes a channel switch count field. When a value of the channel switch count field is a third value, the channel switch count field indicates that a channel switch occurs immediately before a next target beacon transmission time; or when a value of the channel switch count field is a fourth value, the channel switch count field indicates that a channel switch occurs at any time after the management frame is sent or that a channel switch has occurred.

For a specific implementation of the first STA in the eleventh aspect, refer to behavior functions of the first STA in the communication method provided in any one of the tenth aspect or the possible designs of the tenth aspect.

According to a twelfth aspect, an embodiment of this application provides a first STA. The first STA may be the first STA or a chip or a system on chip in the first STA. The first STA may implement functions performed by the first STA in the foregoing aspects or the possible designs, and the functions may be implemented by hardware. In a possible design, the first STA may include a transceiver. The transceiver may be configured to support the first STA in implementing the function in any one of the tenth aspect or the possible designs of the tenth aspect. For example, the transceiver may be configured to receive a management frame from a first access point AP. The management frame includes an ML element, the ML element includes channel switch information of an AP, in a first AP multi-link device, that has performed a channel switch, and the ML element is up to that the first STA receives a next delivery traffic indication map DTIM beacon frame sent by the first AP. The first AP multi-link device includes the first AP; and the STA multi-link device includes the first STA. A processor is configured to obtain the channel switch information based on the ML element, so that a STA that is in the STA multi-link device and that is associated with the AP that has performed the channel switch obtains the channel switch information. In still another possible design, the first STA may further include a memory. The memory is configured to store computer-executable instructions and data that are necessary for the first STA. When the first STA runs, the transceiver and the processor execute the computer-executable instructions stored in the memory, so that the first STA performs the communication method according to any one of the tenth aspect or the possible designs of the tenth aspect.

For a specific implementation of the first STA in the twelfth aspect, refer to behavior functions of the first STA in the communication method provided in any one of the tenth aspect or the possible designs of the tenth aspect.

According to a thirteenth aspect, a communication apparatus is provided. The communication apparatus includes one or more processors and one or more memories. The one or more memories are coupled to the one or more processors. The one or more memories are configured to store a computer program or instructions. The one or more processors are configured to run the computer program or the instructions. When the one or more processors execute the computer program or the instructions, the communication method according to any one of the first aspect or the possible designs of the first aspect is performed, or the communication method according to the fourth aspect or any possible design of the fourth aspect is performed; or the communication method according to the seventh aspect or any possible design of the seventh aspect is performed; or the communication method according to the tenth aspect or any possible design of the tenth aspect is performed.

In a possible implementation, the memory is located outside the communication apparatus. In another possible implementation, the memory is located inside the communication apparatus. In this embodiment of this application, the processor and the memory may alternatively be integrated into one component. In other words, the processor and the memory may alternatively be integrated together.

In a possible design, the communication apparatus further includes one or more communication interfaces. The one or more communication interfaces are coupled to the one or more processors, and the one or more communication interfaces are configured to communicate with another module other than the communication apparatus. For the communication interface, the one or more communication interfaces are coupled to the one or more processors.

According to a fourteenth aspect, a communication apparatus is provided. The communication apparatus includes an interface circuit and a logic circuit. The interface circuit is coupled to the logic circuit. The logic circuit is configured to perform the communication method according to any one of the first aspect or the possible designs of the first aspect, or perform the communication method according to any one of the fourth aspect or the possible designs of the fourth aspect, or perform the communication method according to any one of the seventh aspect or the possible designs of the seventh aspect, or perform the communication method according to any one of the tenth aspect or the possible designs of the tenth aspect, where the interface circuit is configured to communicate with another module other than the communication apparatus.

According to a fifteenth aspect, a computer-readable storage medium is provided. The computer-readable storage medium stores computer instructions or a program. When the computer instructions or the program are run or runs on a computer, the computer performs the communication method according to any one of the first aspect or the possible designs of the first aspect, or performs the communication method according to any one of the fourth aspect or the possible designs of the fourth aspect, or performs the communication method according to any one of the seventh aspect or the possible designs of the seventh aspect, or performs the communication method according to any one of the tenth aspect or the possible designs of the tenth aspect.

According to a sixteenth aspect, a computer program product including computer instructions is provided. When the computer program product runs on a computer, the communication method according to any one of the first aspect or the possible designs of the first aspect is performed, or the communication method according to any one of the fourth aspect or the possible designs of the fourth aspect is performed, or the communication method according to any one of the seventh aspect or the possible designs of the seventh aspect is performed, or the communication method according to any one of the tenth aspect or the possible designs of the tenth aspect is performed.

According to a seventeenth aspect, an embodiment of this application provides a computer program. When the computer program runs on a computer, the communication method according to any one of the first aspect or the possible designs of the first aspect, or the communication method according to any one of the fourth aspect or the possible designs of the fourth aspect, or the communication method according to any one of the seventh aspect or the possible designs of the seventh aspect is performed.

For technical effects brought by any design in the thirteenth aspect to the seventeenth aspect, refer to technical effects brought by any possible design in the first aspect, technical effects brought by any possible design in the fourth aspect, technical effects brought by any possible design in the seventh aspect, or technical effects brought by any possible design in the tenth aspect. Details are not described again.

According to an eighteenth aspect, a communication system is provided. The communication system includes the first AP according to either of the second aspect and the third aspect and the first STA according to either of the fifth aspect and the sixth aspect; or includes the first AP according to either of the eighth aspect and the ninth aspect and the first STA according to either of the eleventh aspect and the twelfth aspect.

BRIEF DESCRIPTION OF DRAWINGS

FIG. 1 is a schematic diagram of a frame format of a multiple BSSID element according to an embodiment of this application;

FIG. 10 is a schematic diagram of a frame format of an element related to a channel switch according to an embodiment of this application;

DESCRIPTION OF EMBODIMENTS

Figure 2:
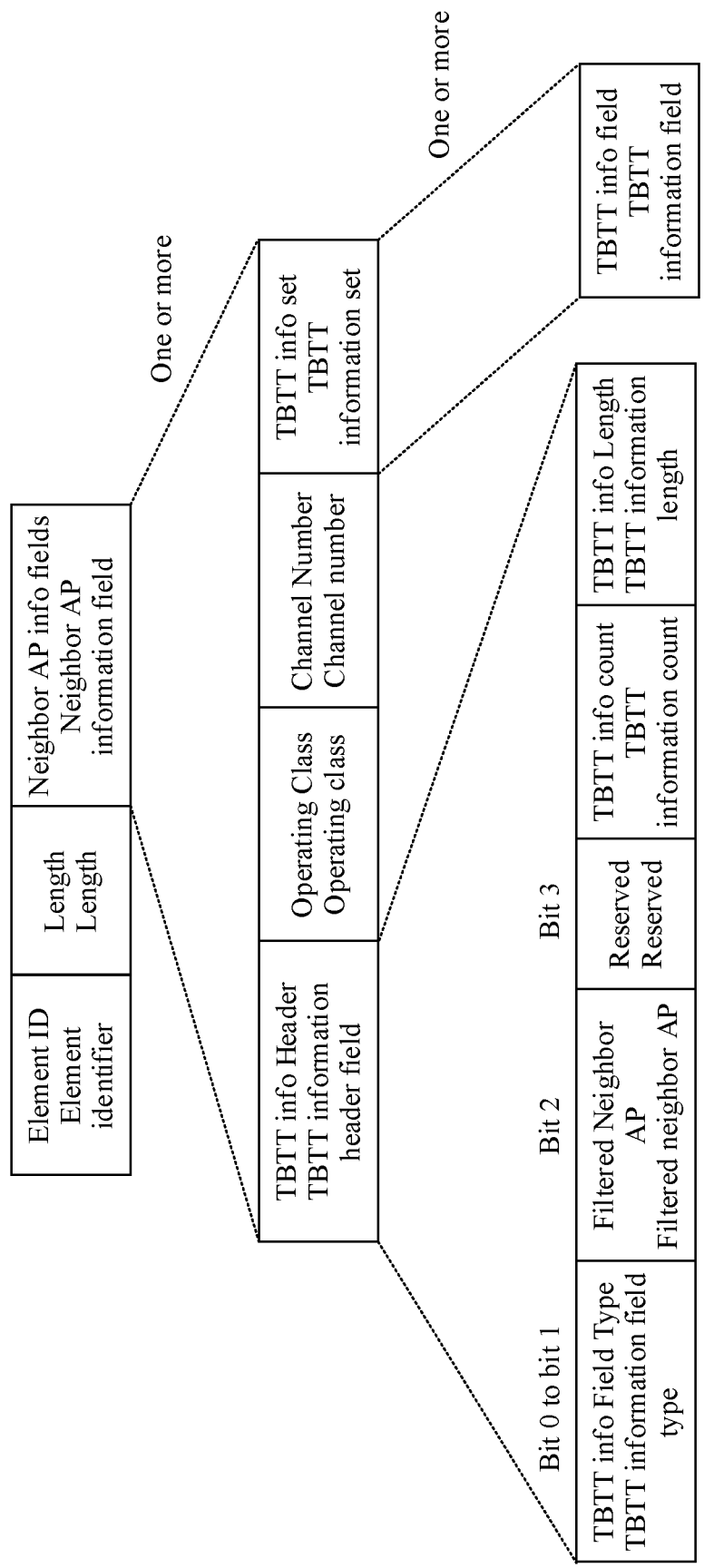
FIG. 2 is a schematic diagram of a frame format of a reduced neighbor report element according to an embodiment of this application.

Before embodiments of this application are described, technical terms used in embodiments of this application are described.

To greatly increase a service transmission rate of a wireless local area network (wireless local area network, WLAN) system, the Institute of Electrical and Electronics Engineers (institute of electrical and electronics engineers, IEEE) 802.11ax standard further uses an orthogonal frequency division multiple access (orthogonal frequency division multiple access, OFDMA) technology based on an existing orthogonal frequency division multiplexing (orthogonal frequency division multiplexing, OFDM) technology. The OFDMA technology can support multiple nodes to simultaneously send and receive data. This achieves multi-station diversity gains. In addition, the federal communications commission (federal communications commission, FCC) released a new free frequency band of 5925 MHz to 7125 MHz, where the frequency band is referred to as 6 GHz below. Therefore, an operating range of an 802.11ax-compliant device is expanded from 2.4 GHz and 5 GHz to 2.4 GHz, 5 GHz, 6 GHz, and the like.

IEEE 802.11ax next-generation Wi-Fi protocol extremely high throughput (extremely high throughput, EHT) devices are forward compatible. Therefore, the devices also support operating spectra of the 802.11ax-compliant device, that is, 2.4 GHz, 5 GHz, and 6 GHz frequency bands. The IEEE 802.11ax next-generation wireless fidelity (wireless fidelity, WiFi) protocol EHT device performs channel division based on the latest released free 6 GHz frequency band, and can support a bandwidth larger than a maximum bandwidth of 160 MHz that is supported at 5 GHz, for example, can support 320 MHz.

A peak throughput for the IEEE 802.11ax next-generation Wi-Fi EHT device can be increased by using an ultra-large bandwidth, and can also be increased by increasing a quantity of streams, for example, increasing the quantity of streams to 16, through cooperation on multiple frequency bands (2.4 GHz, 5 GHz, and 6 GHz) and the like. On a same frequency band, a peak throughput may be further increased through cooperation on multiple channels or in another manner. This reduces a service transmission delay. In this specification, multiple frequency bands or multiple channels are collectively referred to as multiple links.

The IEEE 802.11ax next-generation Wi-Fi EHT device uses a multi-link cooperation technology to aggregate multiple inconsecutive links to form ultra-large bandwidth. In addition to aggregating higher bandwidth, the multi-link cooperation technology may further be used for simultaneously sending data packets of a same service to a same station.

A multiple basic service set identifier set (multiple basic service set identifier set, which may be referred to as a multiple BSSID set) may be understood as a set of some cooperative access points (access point, AP). All the cooperative APs use a same operating class, a same channel number, and a same antenna interface. In the multiple BSSID set, there is only one transmitted (Transmitted) BSSID AP, and other APs are non-transmitted (Nontransmitted) BSSID APs. Information about the multiple BSSID set (that is, a multiple BSSID element) is carried in a beacon frame (beacon), a probe response frame (probe response), or a neighbor report sent by the transmitted BSSID AP. Information about a BSSID of the non-transmitted BSSID AP is derived by a station based on the beacon frame, the probe response frame, the multiple BSSID element, or the like. The BSSID of the non-transmitted BSSID AP is calculated based on a BSSID of the transmitted BSSID AP and a BSSID index field in a multiple BSSID index element in a non-transmitted BSSID profile sub-element corresponding to the non-transmitted BSSID. For a specific method, refer to the 802.11-2020 protocol.

The multiple BSSID set may also be understood as including multiple APs. Each AP manages one BSS, and different APs may have different SSIDs and permissions, for example, a security mechanism or a transmission opportunity.

In the multiple BSSID set, only an AP whose BSSID is a transmitted BSSID can send a beacon frame and a probe response frame, and an AP whose BSSID is not a transmitted BSSID does not send a beacon frame. Therefore, if a probe request frame sent by a STA is sent to an AP whose BSSID is a non-transmitted BSSID in the multiple BSSID set, the AP whose BSSID is the transmitted BSSID in the multiple BSSID set helps respond and send a probe response frame.

Among the multiple APs in the multiple BSSID set, a BSSID of one AP is set to a transmitted BSSID, and a transmitted BSSID AP may be referred to as a transmitted AP. A BSSID of another AP is set to a non-transmitted BSSID, and a non-transmitted BSSID AP may be referred to as a non-transmitted AP.

The beacon frame sent by the transmitted AP may include a multiple BSSID element. A frame format of the multiple BSSID element is shown in FIG. 1. The multiple BSSID element may include an element ID field, a length field, a maximum BSSID indicator field, and an optional sub-element field. The maximum BSSID indicator field indicates a maximum quantity n of BSSIDs included in the multiple BSSID set. The optional sub-element field includes information about the BSSID of the non-transmitted BSSID AP, and is specifically the non-transmitted BSSID profile sub-element.

In a communication scenario in which various types of users are supported in a small area, if different independent APs are used in a small area, each independent AP attempts to find a clean channel. In this case, channel interference between independent APs cannot be avoided. Channel interference can be avoided by using a manner in which one AP supports multiple BSSIDs, that is, one AP is virtualized into multiple APs for different service types or user types.

To be associated with and establish a connection to an AP, a station first needs to discover the AP through scanning. There are two types of scanning: active scanning and passive scanning.

Passive scanning is a manner of discovering an AP by receiving a management frame sent by the AP on a channel. The management frame may be a beacon frame, an association response frame, a re-association response frame, an authentication frame, a probe response frame, or the like.

For example, the station may jump on different channels to search for a reduced neighbor report element in the beacon frame sent by the AP. Once the station obtains basic information about neighbor APs of the AP based on the beacon frame, the station may further obtain other additional information from the AP by exchanging a probe request (probe request) frame and a probe response frame. Certainly, the station may jump on different channels to search for the beacon frame sent by the AP, and directly learn all information of the AP.

In an active scanning mode, the station actively sends a broadcast probe request when not detecting a beacon frame. After receiving the probe request frame, the AP replies with a probe response frame if specific conditions are met.

In a scanning process, to assist a station in fast scanning, the AP carries a reduced neighbor report element (reduced neighbor report element, RNR) in a management frame, for example, a beacon frame or a probe response frame, to prevent the station from continuous channel scanning. This reduces scanning time of the station.

Reduced neighbor report element: The AP may carry the reduced neighbor report element in the management frame. During scanning, the station may receive a management frame sent by the AP, obtains information about neighbor APs based on the reduced neighbor report element in the management frame, and then chooses an appropriate AP to associate with.

Specifically, the reduced neighbor report element generally carries one or more neighbor AP information (neighbor AP information) fields, to describe information about one or more neighbor APs and respective BSSs belonging to each of the neighbor APs. As shown in FIG. 2, the reduced neighbor report element may include the following fields: a target beacon transmission time information header (target beacon transmission time information header, TBTT information header) field, an operating class (operating class) field, a channel number (channel number) field, and a TBTT information set field.

The target transmission time information header field in the beacon frame may include a TBTT information field type (TBTT information field type) field, a filtered neighbor AP (filtered neighbor AP) field, a reserved (reserved) field, a TBTT information count (TBTT information count) field, and a TBTT information length (TBTT information length) field.

The TBTT information field type field may indicate a TBTT information type, and is used together with the TBTT information length field to indicate a format of a TBTT information field. The filtered neighbor AP field may indicate whether an SSID of any BSS carried in the neighbor AP information fields match an SSID in the probe response frame. A quantity of bits in the reserved field may be 1. The TBTT information count field may indicate a quantity of TBTT information fields included in a TBTT information set. The TBTT information length field may indicate a length of each TBTT information field. Specific information formats carried in different lengths may be shown in the following Table 1:

TABLE 1

| TBTT information length (byte) | Content carried in a TBTT information field |
| --- | --- |
| 1 | TBTT offset (offset) field of a neighbor AP |
| 2 | TBTT offset field and BSS parameter field of a neighbor AP |
| 5 | TBTT offset field and short SSID field of a neighbor AP |
| 6 | TBTT offset field, short SSID field, and BSS parameter field of a neighbor AP |
| 7 | TBTT offset field and BSSID field of a neighbor AP |
| 8 | TBTT offset field, BSSID field, and BSS parameter |

TABLE 1-continued

| TBTT information length (byte) | Content carried in a TBTT information field |
| --- | --- |
|  | field of a neighbor AP |
| 11 | TBTT offset field, BSSID field, and short SSID field of a neighbor AP |
| 12 | TBTT offset field, BSSID field, short SSID field, and BSS parameter field of a neighbor AP |
| 0, 9 to 10 | Reserved |
| 13 to 255 | Reserved, but information of first 12 bytes is the same as fields carried when the TBTT information length is 12 |

Figure 3:
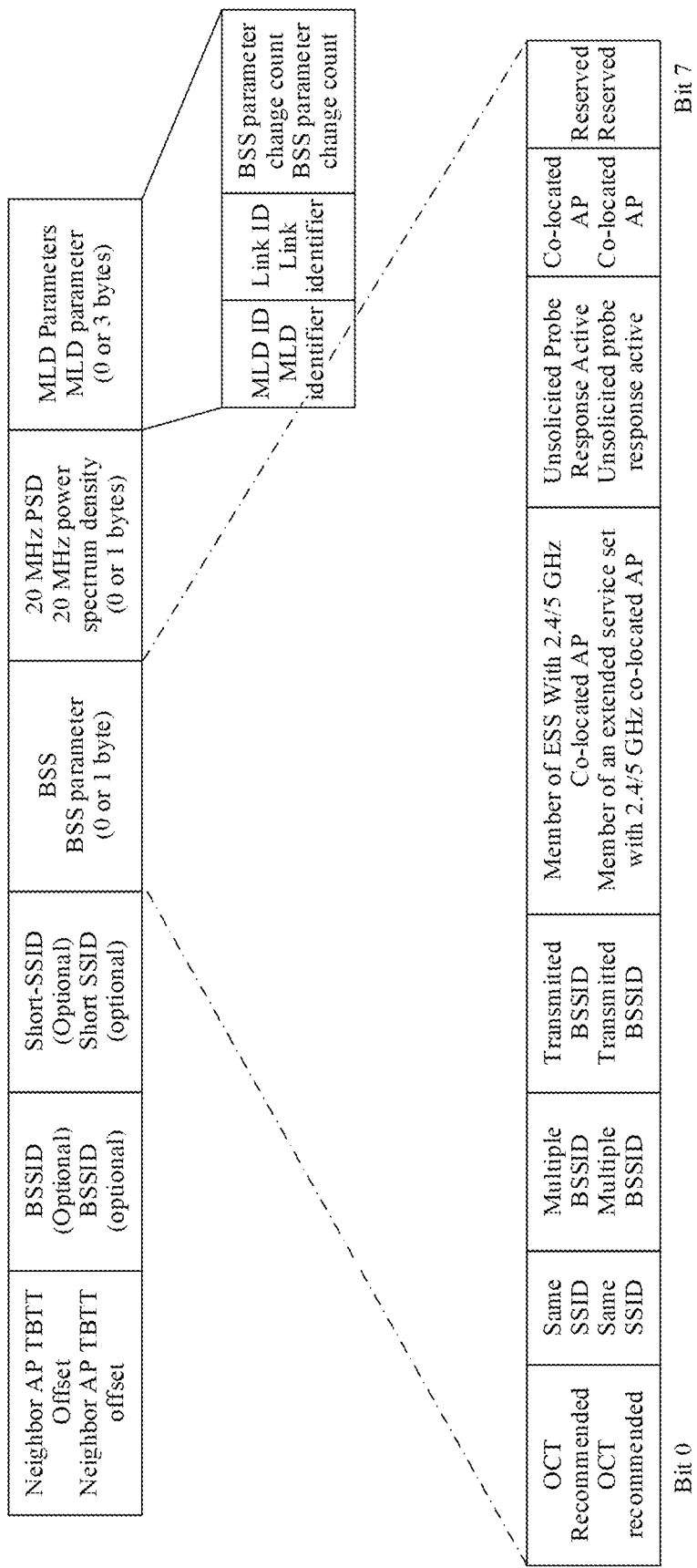
FIG. 3 is a schematic diagram of a frame format of a TBTT information field according to an embodiment of this application.

As shown in FIG. 3, when the TBTT information length is 12 bytes, the TBTT information field may include: a neighbor AP target beacon transmission time offset (neighbor AP TBTT offset) field that indicates a time offset between sending a beacon frame by a neighbor AP and sending a beacon frame by a reporting AP; a BSSID field that indicates a BSS identifier corresponding to the neighbor AP; a short service set identifier (Short SSID) field that indicates an identifier of a service set to which the neighbor AP belongs; a BSS parameter (BSS parameter) field that indicates a related parameter of the neighbor AP; a 20 MHz power spectral density field (power spectral density, PSD) that indicates a maximum transmission power of a reported AP on primary 20 MHz; and a multi-link device (multi-link device, MLD) parameter field.

The BSS parameter field may include: an on channel tunnel recommended (on channel tunnel recommended, OCT recommended) field that indicates that the neighbor AP expects to exchange a media access control protocol data unit (media access control protocol data unit, MPDU) of a management type with the reporting AP by using an OCT mechanism; a same service set identifier (Same SSID) field that indicates whether the neighbor AP and the reporting AP have a same SSID; a multiple basic service set identifier field that indicates whether the neighbor AP belongs to a part of a multiple BSSID set; a transmission basic service set identifier field that further indicates whether the neighbor AP is with a transmitted BSSID or a non-transmitted BSSID if the neighbor AP belongs to the part of the multiple BSSID set; a member of ESS with 2.4/5 GHz co-located AP (member of ESS with 2.4/5 GHz Co-located AP) field that indicates whether the neighbor AP shares a location with a 2.4/5 GHz AP (in other words, whether the neighbor AP is a 6 GHz-only AP) and whether the neighbor AP is a member of an extended service set; an unsolicited probe response active (unsolicited probe response active) field that indicates whether the neighbor AP enables an unsolicited probe response; and a co-located AP (Co-located AP) field that indicates whether the neighbor AP and the reporting AP are co-located.

The MLD parameter field may include an MLD identifier (identifier, ID) field that indicates an identifier of an AP MLD to which the reported AP belongs; a link identifier (link ID) that indicates a link identifier of the reported AP, where the link identifier represents a combination <operating class, channel number, BSSID of the AP>; and a BSS parameter change count (BSS parameter change count) field that indicates a critical BSS parameter change count of the reported AP, where an initial value is 0.

It should be noted that, in embodiments of this application, an AP described in a neighbor report element (neighbor report element) or a reduced neighbor report element is a reported AP (reported access point), and a subsequently mentioned neighbor AP may be understood as a reported AP.

An AP that sends the neighbor report element or the reduced neighbor report element is a reporting AP (reporting access point).

In a WLAN communication system, a multi-link device that can support concurrent communication on multiple links is provided to improve transmission efficiency. The multi-link device may include one or more stations. The station may be an AP, or may be a non-access-point station (non-access point station, non-AP STA). The non-AP STA may also be briefly described as a STA.

When a STA associated with an AP in an AP multi-link device is in a doze state, where the STA belongs to a non-AP multi-link device, and the AP is performing a channel switch (in this case, a beacon frame sent by the AP on a link on which the AP operates carries an element related to the channel switch; if the AP is a non-transmitted BSSID AP in a multiple BSSID set, a beacon frame sent by a transmitted AP corresponding to the AP carries the element related to the channel switch of the AP), another AP from the same AP multi-link device (if the AP is a non-transmitted BSSID AP in the multiple BSSID set, the other AP is the transmitted AP in the multiple BSSID set) may carry the element related to the channel switch of the AP in a management frame. A STA (belonging to the same non-AP multi-link device) associated with the other AP learns that the AP is performing the channel switch. Therefore, the STA belonging to the same non-AP multi-link device learns this information.

However, if the AP has performed the channel switch before the other AP belonging to the same AP multi-link device sends the management frame, the other AP (or may be described as a reporting AP) does not carry the element related to the channel switch of the AP. In other words, the non-AP multi-link device cannot learn that the AP has performed the channel switch.

To resolve this problem, embodiments of this application provide a communication method and apparatus. A first AP generates a management frame, where the management frame includes a capability information field, the capability information field includes first indication information, the first indication information indicates whether another AP in a first AP multi-link device has performed a channel switch, and the first AP multi-link device includes the first AP; and the first AP sends the management frame to a first station STA.

In this embodiment of this application, when sending the management frame, the first AP may carry the first indication information to indicate whether the other AP in the first AP multi-link device has performed the channel switch. In this way, the first STA that is associated with the first AP and belongs to a non-AP MLD determines, based on the first indication information, whether the other AP in the first AP multi-link device has performed the channel switch. If the other AP in the first AP multi-link device has performed the channel switch, the STA obtains channel switch information of the AP that has performed the channel switch. Therefore, a STA (even if the STA is in a doze state) that belongs to the same non-AP MLD and that is associated with the AP that has performed the channel switch learns that the AP associated with the STA has performed the channel switch and learns of the channel switch information after the channel switch.

The following describes implementations of embodiments of this application in detail with reference to the accompanying drawings in this specification.

A wireless communication system applicable to embodiments of this application may be a WLAN or a cellular network. The communication method may be implemented by a communication device in a wireless communication system or a chip or a processor in the communication device. The communication device may be a wireless communication device that supports concurrent transmission performed on multiple links. For example, the communication device is referred to as a multi-link device (multi-link device) or a multi-band device (multi-band device). Compared with a device that supports only single-link transmission, the multi-link device has higher transmission efficiency and a higher throughput.

The multi-link device may include one or more affiliated stations STAs (affiliated STA). The affiliated STA is a logical station and may operate on one link. The affiliated station may be an AP or a STA. For ease of description, in this application, a multi-link device whose affiliated station is an AP may be referred to as a multi-link AP, a multi-link AP device, or an AP multi-link device (AP multi-link device, AP MLD). A multi-link device whose affiliated station is a non-AP STA may be referred to as a multi-link STA, a multi-link STA device, or a STA multi-link device (STA multi-link device, STA MLD). For ease of description, "the multi-link device includes an affiliated STA" is also briefly described as "the multi-link device includes a STA" in embodiments of this application.

It should be noted that the multi-link device may include multiple logical stations, and each logical station operates on one link, but the multiple logical stations are allowed to operate on a same link.

The multi-link device may implement wireless communication in compliance with the 802.11 series protocols, for example, in compliance with an EHT station, or in compliance with a station that is based on 802.11be or compatible with 802.11be, to implement communication with another device. Certainly, the other device may be a multi-link device or may not be a multi-link device.

For example, the multi-link device in embodiments of this application may be a single-antenna device, or may be a multi-antenna device. For example, the multi-link device may be a device with more than two antennas. A quantity of antennas included in the multi-link device is not limited in this embodiment of this application. In embodiments of this application, the multi-link device may allow services of a same access type to be transmitted on different links, or even allow same data packets to be transmitted on different links. Alternatively, the multi-link device may not allow services of a same access type to be transmitted on different links, but may allow services of different access types to be transmitted on different links.

For example, the multi-link device is an apparatus having a wireless communication function. The apparatus may be a device of an entire system, or may be a chip, a processing system, or the like installed in the device of the entire system. The device on which the chip or the processing system is installed may be controlled by the chip or the processing system, to implement the method and functions in embodiments of this application. For example, the STA MLD in embodiments of this application has a wireless transceiver function, may support the 802.11 series protocols, and may communicate with an AP MLD, another STA MLD, or a single-link device. For example, the STA MLD is any user communication device that allows a user to communicate with an AP and further communicate with a WLAN. For example, the STA MLD may be user equipment that can be connected to a network, such as a tablet computer, a desktop computer, a laptop computer, a notebook computer, an ultra-mobile personal computer (ultra-mobile personal computer, UMPC), a handheld computer, a netbook, a personal digital assistant (personal digital assistant, PDA), or a mobile phone, may be an Internet of Things node in an Internet of Things, or may be a vehicle-mounted communication apparatus in an Internet of Vehicles. The STA MLD may alternatively be a chip and a processing system in the foregoing terminals.

The AP MLD in embodiments of this application is an apparatus that serves the STA MLD, and may support the 802.11 series protocols. For example, the AP MLD may be a communication entity such as a communication server, a router, a switch, or a bridge, or the AP MLD may include various forms of macro base stations, micro base stations, and relay stations. Certainly, the AP MLD may alternatively be a chip and a processing system in the various forms of devices, to implement the method and the function in embodiments of this application. In addition, the multi-link device may support high-rate and low-latency transmission. With continuous evolution of application scenarios of a wireless local area network, the multi-link device may be further applied to more scenarios, for example, a sensor node (for example, a smart water meter, a smart electricity meter, and a smart air detection node) in a smart city, a smart device (for example, a smart camera, a projector, a display screen, a television, a stereo, a refrigerator, and a washing machine) in a smart home, a node in an internet of things, an entertainment terminal (for example, a wearable device such as an AR and a VR), a smart device (for example, a printer or a projector) in a smart office, an internet of vehicles device in an internet of vehicles, and some infrastructures (for example, a vending machine, a self-service navigation console in a supermarket, a self-service cash register, and a self-service ordering machine) in a daily life scenario. Specific forms of the STA MLD and the AP MLD are not specifically limited in embodiments of this application, and are merely examples for description herein. The 802.11 protocol may be a protocol that supports 802.11be or is compatible with 802.11be.

An operating frequency band of the multi-link device may include one or more of sub 1 GHz, 2.4 GHz, 5 GHz, 6 GHz, and a high frequency 60 GHz, for example, include 2.4 GHz, 5 GHz, and 6 GHz.

In the multi-link device, each link may include a link identifier, where the link identifier represents one station operating on one link. In other words, if there is more than one station on one link, more than one link identifier represents the stations. A link mentioned below sometimes also represents a station operating on the link.

During data transmission, an AP MLD and a STA MLD may use a link identifier to identify a link or a station on a link. Before communication, the AP MLD and the STA MLD may first negotiate or communicate with each other on a correspondence between a link identifier and a link or a station on a link. Then, during data transmission, the link identifier is carried to indicate the link or the station on the link, so that transmission of a large amount of signaling information is not used to indicate the link or the station on the link. This reduces signaling overheads and improves transmission efficiency.

In an example, a management frame sent by an MLD AP for establishing the BSS, for example, a beacon frame, carries one element, and the element includes a plurality of link identifier information fields. The link identifier information field may indicate a correspondence between a link identifier and a station that operates on a link corresponding to the link identifier. The link identifier information field not only includes a link identifier, but also includes one or more pieces of the following information: a MAC address, an operating class, and a channel number. One or more of the MAC address, the operating class, and the channel number may indicate one link. For an AP, a MAC address of the AP is a BSSID of the AP. In another example, in a multi-link device association process, the AP MLD and the STA multi-link device negotiate a plurality of link identifier information fields. Multi-link device association means that one AP in the AP MLD associates with one STA in the STA MLD once. The association may help multiple STAs in the STA MLD associate with multiple APs in the AP MLD, where one STA associates with one AP.

In subsequent communication, the AP MLD or the STA multi-link device identifies or represents a station in the STA multi-link device by using a link identifier. The link identifier may further represent one or more attributes of a MAC address, an operating class, and a channel number of the station. The MAC address may alternatively be an association identifier of the AP MLD after association. Optionally, if multiple stations operate on one link, meanings identified by a link identifier (which is a numeric ID) include not only an operating class including the link and a channel number, but also an identifier of a station operating on the link, for example, a MAC address or an association identifier (association identifier, AID) of a station.

Although embodiments of this application are mainly described by using a network on which IEEE 802.11 is deployed as an example, a person skilled in the art easily understands that various aspects of this application can be extended to other networks that use various standards or protocols, for example, BLUETOOTH (Bluetooth), a high performance radio LAN (high performance radio LAN, HIPERLAN) (a wireless standard that is similar to the IEEE 802.11 standard, and is mainly used in Europe), a wide area network (WAN), a wireless local area network (wireless local area network, WLAN), a personal area network (personal area network, PAN), or another known or later developed network. Therefore, the various aspects provided in this application may be applicable to any suitable wireless network regardless of a coverage area and a wireless access protocol used.

Figure 4:
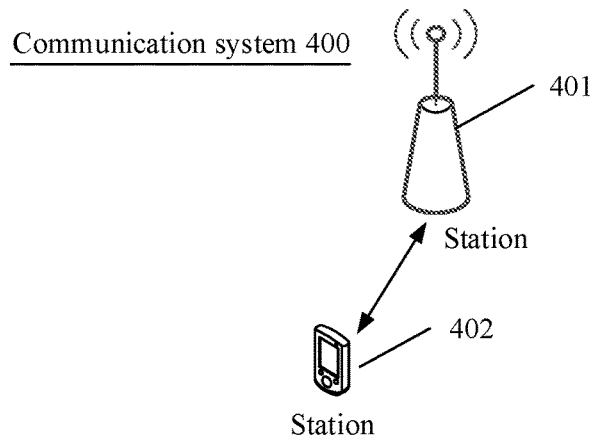
FIG. 4 is a schematic diagram of a structure of a communication system according to an embodiment of this application.

In FIG. 4, a wireless local area network is used as an example to describe a communication system 400 to which an embodiment of this application is applied. The communication system 400 includes a station 401 and a station 402. The station 401 may communicate with the station 402 through multiple links, to improve a throughput. The station 401 may be a multi-link device, and the station 402 may be a single-link device, a multi-link device, or the like. In a scenario, the station 401 is an AP MLD, and the station 402 is a STA MLD or a station (for example, a single-link station). In another scenario, the station 401 is a STA MLD, and the station 402 is an AP (for example, a single-link AP) or an AP MLD. In still another scenario, the station 401 is an AP MLD, and the station 402 is an AP MLD or an AP. In still another scenario, the station 401 is a STA MLD, and the station 402 is a STA MLD or a STA (for example, a single-link station). Certainly, the wireless local area network may further include another device. A quantity and types of devices shown in FIG. 4 are merely examples.

Figure 5:
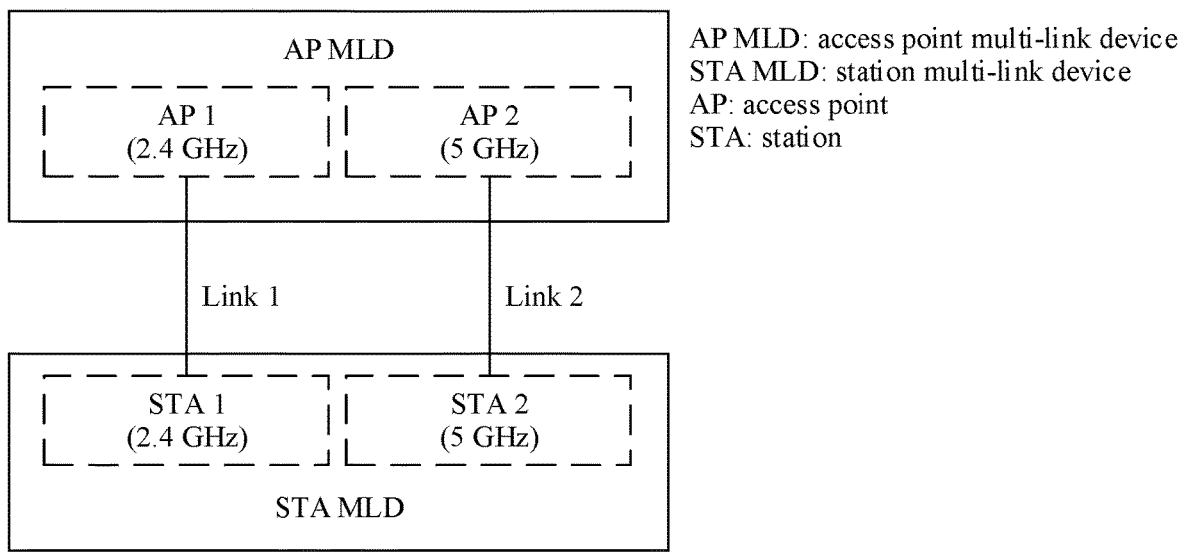
FIG. 5 is a schematic diagram of a structure of a communication system according to an embodiment of this application.
Figure 6:
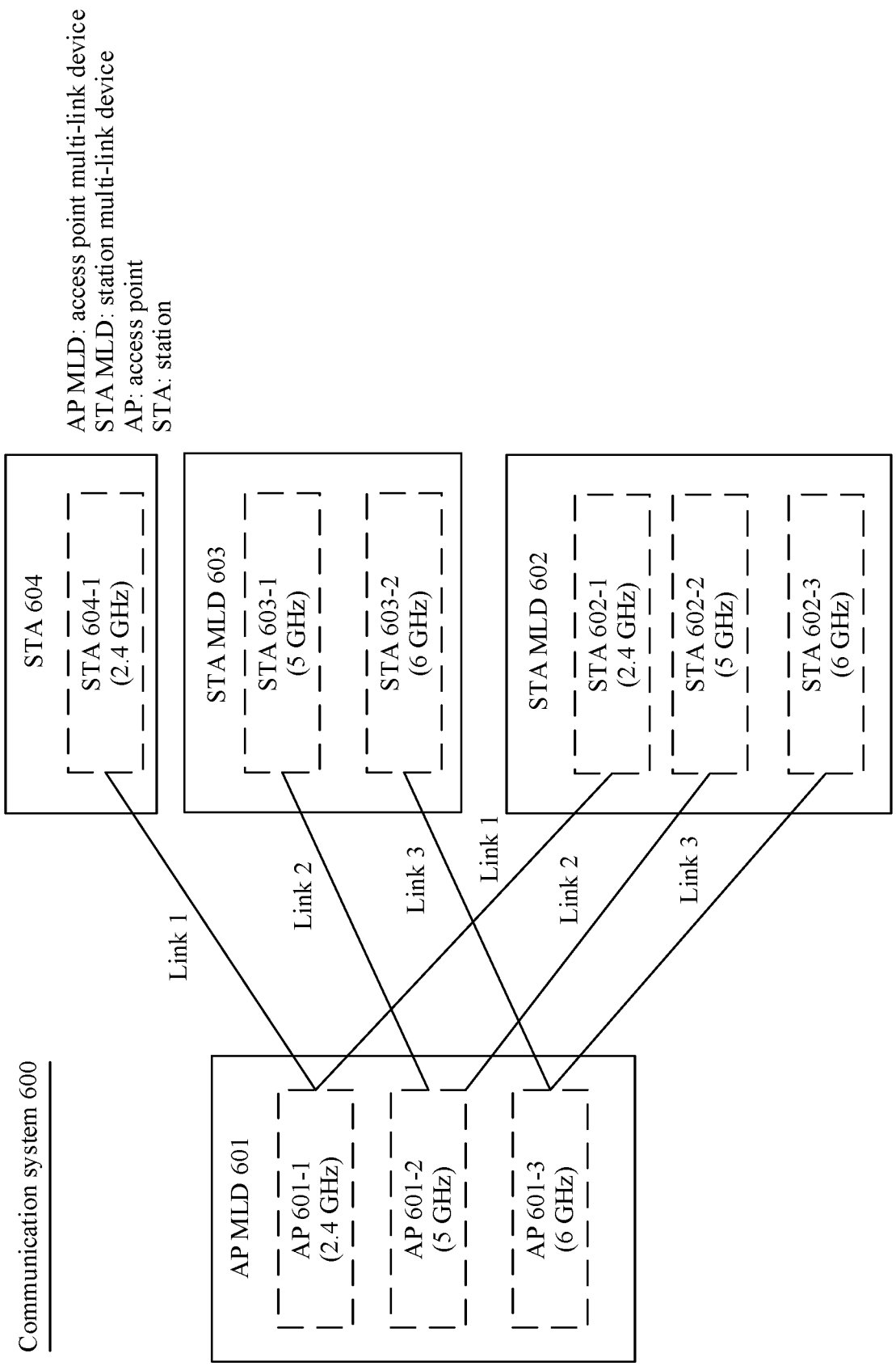
FIG. 6 is a schematic diagram of a structure of a communication system according to an embodiment of this application.

FIG. 5 and FIG. 6 respectively show schematic diagrams of structures of a communication system 500 and a communication system 600. In the communication system 500 and the communication system 600, for example, a multi-link device in a wireless local area network communicates with another device through multiple links.

FIG. 5 is a scenario in which an AP MLD communicates with a STA MLD. The AP MLD includes an affiliated AP 1 and an affiliated AP 2. The STA MLD includes an affiliated STA 1 and an affiliated STA 2. The AP MLD and the STA MLD perform concurrent communication over a link 1 and a link 2.

FIG. 6 is a scenario in which an AP MLD 601 communicates with a STA MLD 602, a STA MLD 603, and a STA 604. The AP MLD 601 includes an affiliated AP 601-1 to an affiliated AP 601-3. The STA MLD 602 includes three affiliated STAs, a STA 602-1, a STA 602-2, and a STA 602-3. The STA MLD 603 includes two affiliated STAs, a STA 603-1 and a STA 603-2. The STA 604-1 and the STA 604 are single-link devices. The AP MLD 601 may separately use a link 1, a link 2, and a link 3 to communicate with the STA MLD 602, use the link 2 and the link 3 to communicate with the STA MLD 603, and use the link 1 to communicate with the STA 604. In an example, the STA 604 operates on a 2.4 GHz frequency band. In the STA MLD 603, the STA 603-1 operates on a 5 GHz frequency band, and the STA 603-2 operates on a 6 GHz frequency band. In the STA MLD 602, the STA 602-1 operates on a 2.4 GHz frequency band, the STA 602-2 operates on a 5 GHz frequency band, and the STA 602-3 operates on a 6 GHz frequency band. The AP 601-1 operating on the 2.4 GHz frequency band in the AP MLD 601 may perform, over the link 1, uplink or downlink data transmission with the STA 604 and the STA 602-2 in the STA MLD 602. The AP 601-2 operating on the 5 GHz frequency band in the AP MLD 601 may perform, over the link 2, uplink or downlink data transmission with the STA 603-1 operating on the 5 GHz frequency band in the STA MLD 603, and may further perform, over the link 2, uplink or downlink data transmission with the STA 602-2 operating on the 5 GHz frequency band in the STA MLD 602. The AP 601-3 operating on the 6 GHz frequency band in the AP MLD 601 may perform, over the link 3, uplink or downlink data transmission with the STA 602-3 operating on the 6 GHz frequency band in the STA MLD 602, and may further perform, over the link 3, uplink or downlink data transmission with the STA 603-2 in the STA MLD.

It should be noted that FIG. 5 shows that the AP MLD supports only two frequency bands. FIG. 6 shows an example in which the AP MLD 701 supports only three frequency bands (2.4 GHz, 5 GHz, and 6 GHz), each frequency band corresponds to one link, and the AP MLD 701 may operate on one or more links of the link 1, the link 2, or the link 3. On an AP side or a STA side, the link herein may also be understood as a station operating on the link. In an actual application, the AP MLD and the STA MLD may further support more or fewer frequency bands. In other words, the AP MLD and the STA MLD may operate on more links or fewer links. This is not limited in embodiments of this application.

Figure 7:
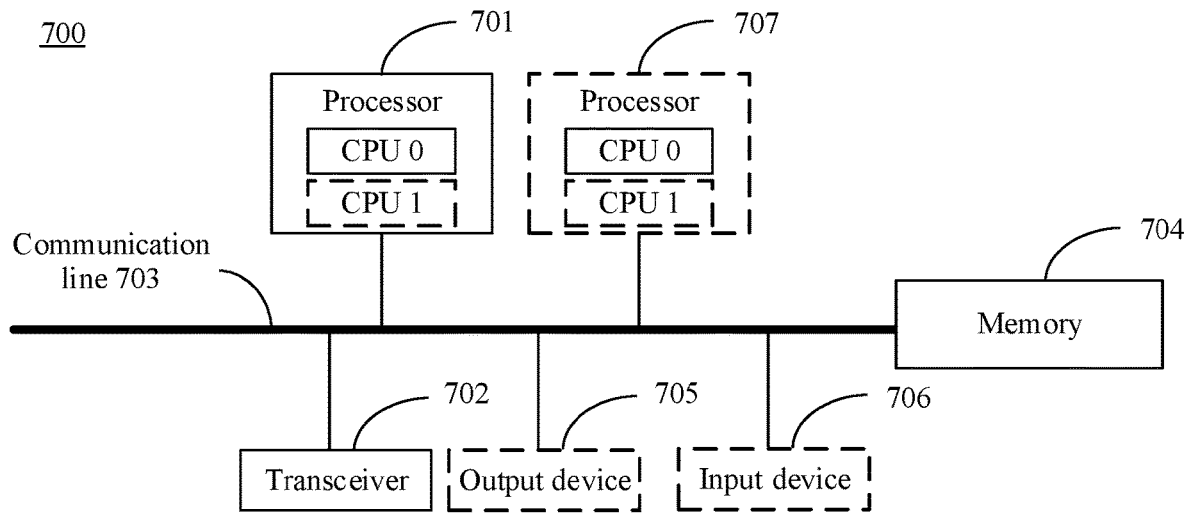
FIG. 7 is a schematic diagram of a structure of a communication apparatus according to an embodiment of this application.

During specific implementation, as shown in FIG. 4 to FIG. 6, each access point device and each station device may use a composition structure shown in FIG. 7, or include a component shown in FIG. 7. FIG. 7 is a schematic composition diagram of a communication apparatus 700 according to an embodiment of this application. The communication apparatus 700 may be an access point device or a chip or a system-on-a-chip in the access point device, or may be a station device or a chip or a system-on-a-chip in the station device. As shown in FIG. 7, the communication apparatus 700 includes a processor 701, a transceiver 702, and a communication line 703.

Further, the communication apparatus 700 may further include a memory 704. The processor 701, the memory 704, and the transceiver 702 may be connected through the communication line 703.

The processor 701 is a central processing unit (central processing unit, CPU), a general-purpose processor, a network processor (network processor, NP), a digital signal processor (digital signal processing, DSP), a microprocessor, a microcontroller, a programmable logic device (programmable logic device, PLD), or any combination thereof. Alternatively, the processor 701 may be another apparatus having a processing function, for example, a circuit, a component, or a software module. This is not limited.

The transceiver 702 is configured to communicate with another device or another communication network. The other communication network may be the Ethernet, a radio access network (radio access network, RAN), a wireless local area network (wireless local area network, WLAN), or the like. The transceiver 702 may be a module, a circuit, a transceiver, or any apparatus that can implement communication.

The communication line 703 is configured to transmit information between components included in the communication apparatus 700.

The memory 704 is configured to store instructions. The instructions may be a computer program.

The memory 704 may be a read-only memory (read-only memory, ROM) or another type of static storage device that can store static information and/or instructions; may be a random access memory (random access memory, RAM) or another type of dynamic storage device that can store information and/or instructions; or may be an electrically erasable programmable read-only memory (electrically erasable programmable read-only memory, EEPROM), a compact disc read-only memory (compact disc read-only memory, CD-ROM) or another compact disc storage, an optical disc storage (including a compact optical disc, a laser disc, an optical disc, a digital versatile disc, a Blu-ray disc, or the like), a magnetic disk storage medium or another magnetic storage device, or the like. This is not limited.

It should be noted that the memory 704 may be independent of the processor 701, or may be integrated with the processor 701. The memory 704 may be configured to store an instruction, program code, data, or the like. The memory 704 may be located inside the communication apparatus 700, or may be located outside the communication apparatus 700. This is not limited. The processor 701 is configured to execute the instructions stored in the memory 704, to implement the communication methods provided in the following embodiments of this application.

In an example, the processor 701 may include one or more CPUs, for example, a CPU 0 and a CPU 1 in FIG. 7.

In an optional implementation, the communication apparatus 700 may include multiple processors. For example, in addition to the processor 701 in FIG. 7, the communication apparatus 700 may further include a processor 707.

In an optional implementation, the communication apparatus 700 further includes an output device 705 and an input device 706. For example, the input device 706 is a device, such as a keyboard, a mouse, a microphone, or a joystick, and the output device 705 is device, such as a display or a speaker (speaker).

It should be noted that the communication apparatus 700 may be a desktop computer, a portable computer, a network server, a mobile phone, a tablet computer, a wireless terminal, an embedded device, a chip system, or a device having a structure similar to that in FIG. 7. In addition, a composition structure shown in FIG. 7 does not constitute a limitation on the communication apparatus. In addition to the components shown in FIG. 7, the communication apparatus may include more or fewer components than those shown in the figure, or some components may be combined, or different component arrangements may be used.

In embodiments of this application, the chip system may include a chip, or may include a chip and another discrete component.

In addition, mutual reference may be made to actions, terms, and the like in embodiments of this application. This is not limited. In embodiments of this application, names of messages exchanged between devices, names of parameters in the messages, or the like are merely examples. Another name may alternatively be used during specific implementation. This is not limited.

Figure 8:
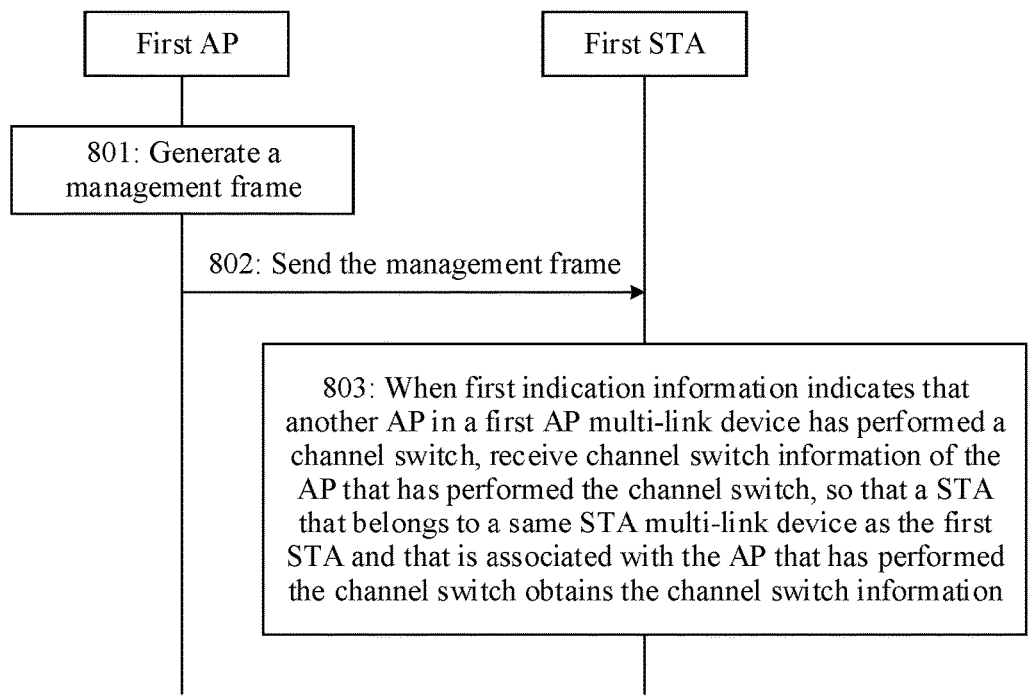
FIG. 8 is a flowchart of a communication method according to an embodiment of this application.

With reference to any communication system in FIG. 4 to FIG. 6, the following describes a communication method provided in an embodiment of this application with reference to FIG. 8. A first AP may be any reporting AP in the communication system shown in FIG. 4 to FIG. 6 (the reporting AP is an AP that sends a management frame, such as a beacon frame and a probe response frame), and a first STA may be any STA associated with the first AP in the communication systems shown in FIG. 4 to FIG. 7 and belongs to a STA multi-link device (or may be described as a non-AP MLD). A first AP multi-link device in which the first AP is located and the STA multi-link device in which the first STA is located may be connected through multi-link communication. Both the first AP and the first STA described in the following embodiments may have components shown in FIG. 7.

FIG. 8 is a flowchart of a communication method according to an embodiment of this application. As shown in FIG. 8, the method may include the following steps.

Step 801: A first access point AP generates a management frame.

A first AP multi-link device may include at least one AP, and the at least one AP may include the first AP. The management frame may include a capability information field, and the capability information field may include first indication information.

For example, the management frame may be one or more of the following: a beacon frame, an association response frame, a re-association response frame, an authentication frame, and a probe response frame.

The first indication information may indicate whether another AP in the first AP multi-link device has performed a channel switch; or the first indication information may indicate whether an AP, including the first AP, in the first AP multi-link device has performed a channel switch.

The following uses an example in which the first indication information indicates whether another AP in the first AP multi-link device has performed a channel switch. It may be understood that the following embodiment is also applicable to a case in which the first indication information indicates whether an AP, including the first AP, in the first AP multi-link device has performed a channel switch.

For example, when another AP in the first AP multi-link device has performed a channel switch, the first indication information may be set to a first value, for example, 1. Otherwise, the first indication information is set to a second value, for example, 0. It should be noted that, if the first indication information is set to the first value, the value needs to be maintained until a next delivery traffic indication map (delivery traffic indication map, DTIM) signal frame. After the DTIM beacon frame, the first indication information is reset to the second value.

Optionally, the capability information field further includes first critical update flag signaling.

The first critical update flag signaling may indicate whether a critical parameter update value of an AP in the first AP multi-link device changes. The critical parameter update value may also be referred to as a BSS parameter change count value, or referred to as a value of a BSS parameter change count field.

For example, when any event in a critical basic service set BSS parameter event corresponding to one AP in the first AP multi-link device occurs, the first AP adjusts a value of a critical parameter update value of the AP. When the critical parameter update value of one AP in the first AP multi-link device changes, the first AP adjusts the first critical update flag signaling.

For example, each time a critical BSS parameter event of any AP occurs, a critical parameter update value of the AP is increased by 1.

For another example, when a value of a critical parameter update value of one AP in the first AP multi-link device changes, the first critical update flag signaling may be set to the first value, for example, 1; otherwise, the first critical update flag signaling is set to a second value, for example, 0. It should be noted that, if the first critical update flag signaling is set to the first value, the value needs to be maintained until a next DTIM beacon frame. After the DTIM beacon frame, the first critical update flag signaling is reset to the second value.

As shown in FIG. 3, the critical parameter update value is located in a BSS parameter change count field in an MLD parameter field in the RNR element.

The critical BSS parameter event may include at least one of the following events: an enhanced distributed channel access EDCA parameter element is modified (modification of the enhanced distributed channel access parameters element), a direct sequence spread spectrum DSSS parameter set element is modified (modification of the direct sequence spread spectrum parameter set), a high throughput operation element is modified (modification of the high throughput operation element), a wide bandwidth channel switch element is included (inclusion of a wide bandwidth channel switch element), a wide bandwidth channel switch wrapper element is included (inclusion of a channel switch wrapper element), an operating mode notification element is included (inclusion of an operating mode notification element), a very high throughput VHT operation element is modified (modification of the very high throughput operation element), a high efficient operation element is modified (modification of the high efficient operation element), a broadcast target wake time TWT element is inserted (insertion of a broadcast target wakeup time element), a BSS color change announcement element is included (inclusion of the BSS color change announcement element), a multi-user MU EDCA parameter set element is modified (modification of the MU enhanced distributed channel access parameter set element), a spatial multiplexing parameter set element is modified (modification of the spatial reuse parameter set element), and an extremely high throughput EHT operation element is modified (modification of the EHT operation element).

Further, the critical BSS parameter event may include any one of the foregoing events.

Optionally, the critical BSS parameter event further includes: a contention-free parameter set element is modified (modification of the contention free parameter set element).

Figure 9:
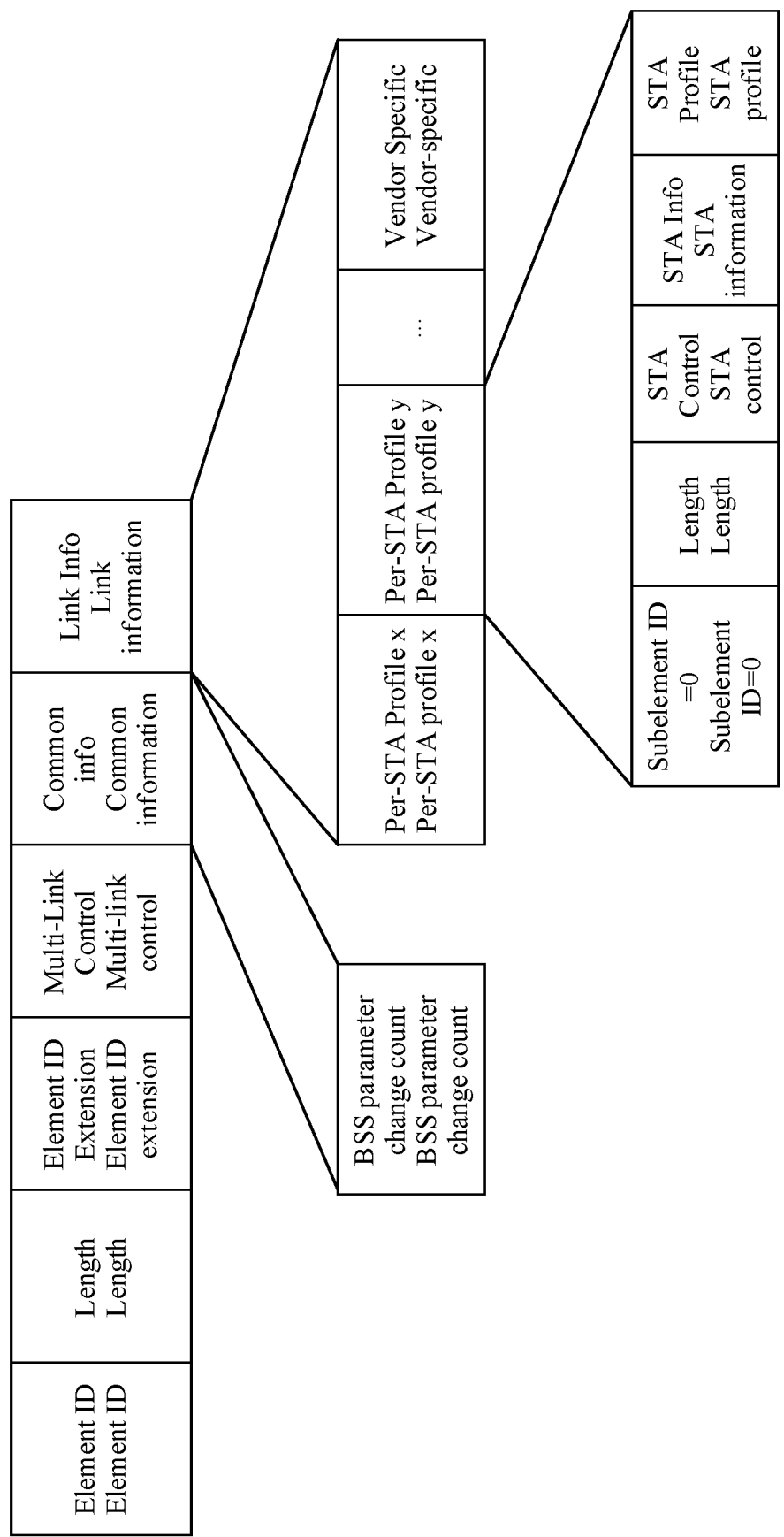
FIG. 9 is a schematic diagram of a frame format of a multi-link element according to an embodiment of this application.

For example, the first AP may carry critical parameter update values of all APs other than the first AP in the first AP multi-link device in the MLD parameter field in the RNR element of the management frame shown in FIG. 3. The first AP may further carry a critical parameter update value of the first AP in a common information field in the multi-link element shown in FIG. 9.

It should be noted that the critical BSS parameter event does not include any one of the following events: a channel switch announcement element is included (inclusion of channel switch announcement element), an extended channel switch announcement element is included (inclusion of extended channel switch announcement element), a quiet element is included (inclusion of quiet element), and a quiet channel element is included (inclusion of quiet channel element).

For the first AP multi-link device, a value of a critical parameter update value of another AP does not change regardless of whether a management frame sent by the other AP includes an element related to a channel switch. In other words, a value of the first critical update flag signaling does not change regardless of whether a management frame sent by another AP includes an element related to a channel switch.

Whether the management frame sent by the other AP includes the element related to the channel switch may also be described as whether the other AP is performing the channel switch. In other words, whether the other AP is performing a channel switch or not does not cause the value of the critical parameter update value of the other AP to change, that is, whether the other AP is performing the channel switch or not does not cause the value of the first critical update flag signaling to change.

Compared with the 802.11ax standard and the 802.11-2020 protocol, an event related to that a channel switch announcement element is included, an event related to that an extended channel switch announcement element is included, an event related to that a quiet element is included, and an event related to that a quiet channel element is included are removed from the critical BSS parameter events. In this way, a STA multi-link device associated with the first AP multi-link device does not obtain repeated channel switch information of the AP based on the RNR element and the multi-link element in the management frame. This reduces power consumption of the STA multi-link device and saves air interface transmission opportunities.

In a possible design, when another AP in the first AP multi-link device is performing a channel switch (that is, the other AP sends a beacon frame or a probe response frame carrying an element related to the channel switch), a multi-link element in the management frame sent by the first AP may carry the element related to the channel switch of the other AP, so that a first STA obtains, based on the management frame, the element related to the channel switch of the AP that performs the channel switch. In this way, a STA that belongs to a same STA multi-link device with the first STA and that is associated with the AP that is performing the channel switch obtains the element related to the channel switch of the AP associated with the STA.

The element related to channel switch may include one or more of the following: a channel switch announcement element, an extended channel switch announcement element, and a maximum channel switch time element.

As shown in (a) in FIG. 10, the channel switch announcement element may include an element number field, a length field, a channel switch mode field, a new channel number field, and a channel switch count field. As shown in (b) in FIG. 10, the extended channel switch announcement element may include an element number field, a length field, a channel switch mode field, a new operating class field, a new channel number field, and a channel switch count field.

The channel switch count field indicates a quantity of TBTTs before a station that sends a channel switch element or an extended channel switch element switches to a new channel, or switches to a new operating class and a new channel. For example, setting the channel switch count field to 1 may indicate that the switch occurs immediately before a next TBTT, and setting the channel switch count field to 0 may indicate that the switch occurs at any time after the frame is sent. The new channel number field indicates a channel number after the channel switch, and the new operating class field indicates an operating class after the channel switch.

It should be noted that a time field in each element related to the channel switch may use a beacon transmission time and a beacon interval of the AP performing the channel switch as a reference.

In still another possible design, before a channel switch target time point, an RNR element in a management frame sent by the first AP includes channel information of an AP (a reported neighbor AP) that has performed a channel switch, and the channel information includes a working operating class and a channel number of the AP (that is, an operating class and a channel number that are before the channel switch) before the time point. After the channel switch target time point, an RNR element in a management frame sent by the first AP includes channel information of the AP (a reported neighbor AP) that has performed the channel switch, where the channel information includes a working operating class and a channel number of the AP (that is, an operating class and a channel number after the channel switch) after the time point.

It should be noted that the operating class and the channel number in the foregoing channel information may alternatively be the channel number.

Step 802: The first AP sends the management frame to a first STA. Correspondingly, the first STA receives the management frame.

Step 803: When the first indication information indicates that another AP in the first AP multi-link device has performed a channel switch, the first STA receives channel switch information of the AP that has performed the channel switch, so that a STA that belongs to a same STA multi-link device as the first STA and that is associated with the AP that has performed the channel switch obtains the channel switch information.

The first STA may be the STA associated with the first AP in the STA multi-link device.

For example, a STA other than the first STA in the STA multi-link device is in a doze state, and the first STA listens to an operating link. The first STA may determine, based on the first indication information in the management frame sent by the first AP, whether another AP in the first AP multi-link device has performed a channel switch.

In a possible design, after the first STA receives the management frame sent by the first AP, if another AP in the first AP multi-link device is performing a channel switch, the first STA may parse a multi-link element in the management frame, to obtain an element related to the channel switch of the AP performing the channel switch. If no AP in the first AP multi-link device is performing a channel switch (for example, a channel switch has occurred), the multi-link element in the management frame received by the first STA does not carry an element related to the channel switch.

In still another possible design, after the first STA receives the management frame sent by the first AP, if the first indication information indicates that another AP in the first AP multi-link device has performed a channel switch, the first STA may parse an RNR element in the management frame, to obtain channel information of the AP that has performed the channel switch. If the first indication information indicates that no other AP in the first AP multi-link device has performed a channel switch, because the RNR element is used for discovering a neighbor AP, the first STA may parse the RNR element in the management frame, or may not parse the RNR element in the management frame to reduce power consumption. Optionally, the STA multi-link device has been associated with the first AP multi-link device.

When the first indication information indicates that an AP in the first AP multi-link device has performed a channel switch (which may alternatively be understood as that channel information that is of any other AP related to the first AP multi-link device and that is in the RNR element has changed or channel information of the first AP has changed), or another AP has performed a channel switch (which may alternatively be understood as that channel information of any other AP related to the first AP multi-link device in the RNR element has changed), the first STA may parse the RNR element in the management frame, to obtain the channel information of the AP that has performed the channel switch. In addition, another STA belonging to the same STA multi-link device as the first STA also learns of the channel information, for example, a STA associated with the AP that has performed the channel switch, to facilitate subsequent communication with the AP associated with the STA based on the channel switch information.

Figure 11:
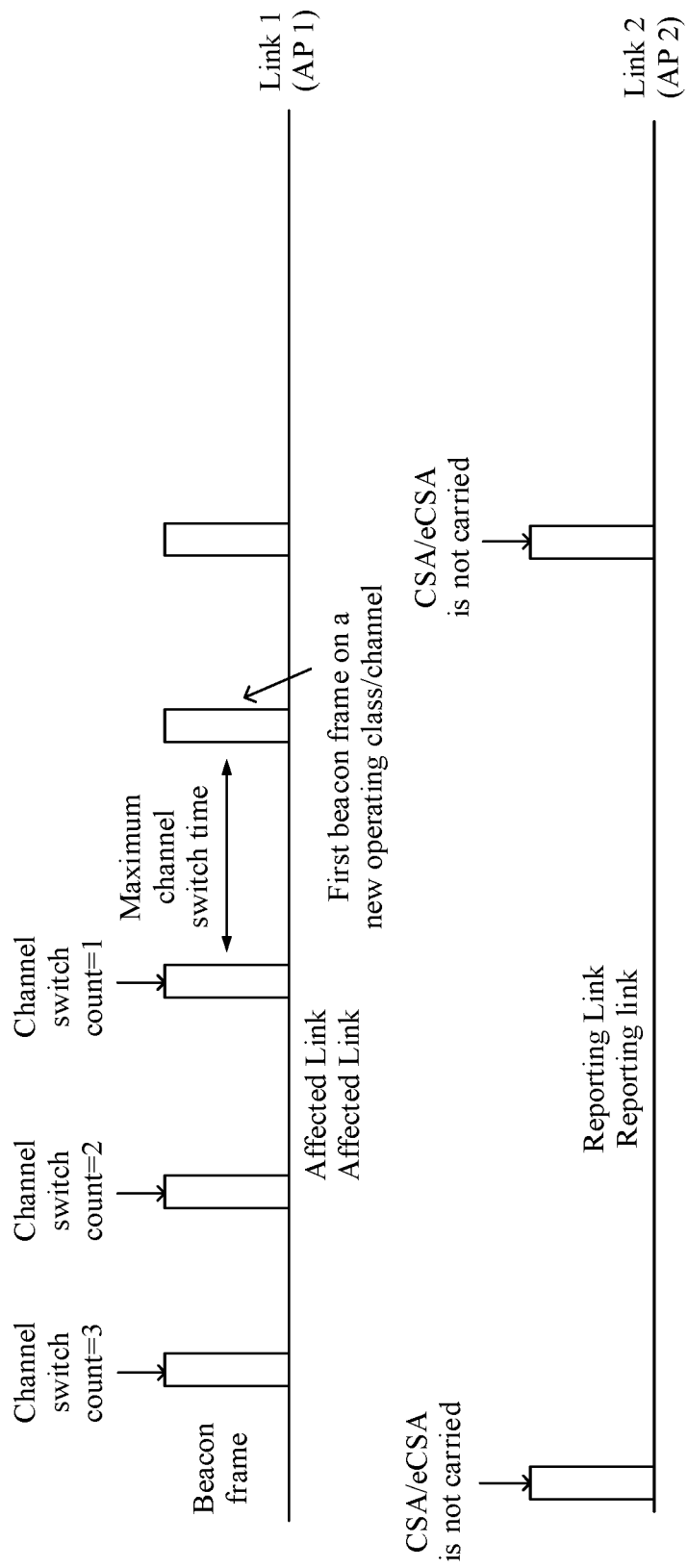
FIG. 11 is a time sequence diagram of a signal according to an embodiment of this application.

For example, as shown in FIG. 11, the STA multi-link device includes a STA 1 and a STA 2, and establishes a multi-link connection to the first AP multi-link device, where the STA 1 and the STA 2 are respectively associated with an AP 1 and an AP 2 in the first AP multi-link device. It is assumed that the STA 1 is in a doze state, and the STA 2 observes a link 2 on which the STA 1 operates. When the AP 1 is performing a channel switch, because an interval between beacon frames sent by the AP 2 on the link 2 is large, the beacon frame on the link 2 does not carry a channel switch announcement element or an extended channel switch announcement element. Therefore, when a first beacon frame is sent on the link 2, the AP 1 does not perform a channel switch; but when a second beacon frame is sent on the link 2, the AP 1 on link 1 has performed the channel switch. In this case, the STA 2 in an awake state in the STA multi-link device cannot learn of channel switch information of the AP 1 located on the link 1. As a result, the STA multi-link device cannot communicate with the AP 1. However, in embodiments of this application, the first indication information is carried in the management frame, so that the STA 2 can determine, based on the first indication information, that another AP in the first AP multi-link device has performed a channel switch, and further parse an RNR element in a beacon frame to obtain channel information of the AP 1, so that the STA 1 associated with the AP 1 obtains the channel information of the AP 1, to ensure normal communication between the STA 1 and the AP 1.

Based on the method shown in FIG. 8, when sending the management frame, the first AP may carry the first indication information to indicate whether the other AP in the first AP multi-link device has performed the channel switch. In this way, the first STA that is associated with the first AP and belongs to a non-AP multi-link device determines, based on the first indication information, whether the other AP in the first AP multi-link device has performed the channel switch.

If the other AP in the first AP multi-link device has performed the channel switch, the STA obtains channel switch information of the AP that has performed the channel switch. Therefore, a STA (even if the STA is in a doze state) that belongs to the same non-AP MLD and that is associated with the AP that has performed the channel switch learns that the AP associated with the STA has performed the channel switch and learns of the channel switch information after the channel switch.

Optionally, if the first AP is in a multiple BSSID set, and the first AP is a transmitted AP, the sent management frame further includes a non-transmitted basic service set identifier BSSID field, and the non-transmitted BSSID field includes second indication information. The second indication information may indicate whether another AP in a second AP multi-link device has performed a channel switch. At least one AP in the second AP multi-link device and the first AP belong to the same multiple BSSID set. The non-transmitted BSSID field is in a non-transmitted BSSID capability element in a non-transmitted BSSID profile sub-element in a multiple BSSID element. The non-transmitted BSSID field may alternatively be referred to as a non-transmitted BSSID capability field, or may have another name.

The other AP in the second AP multi-link device may be another AP in the second multi-link device other than a transmitted AP.

Figure 12:
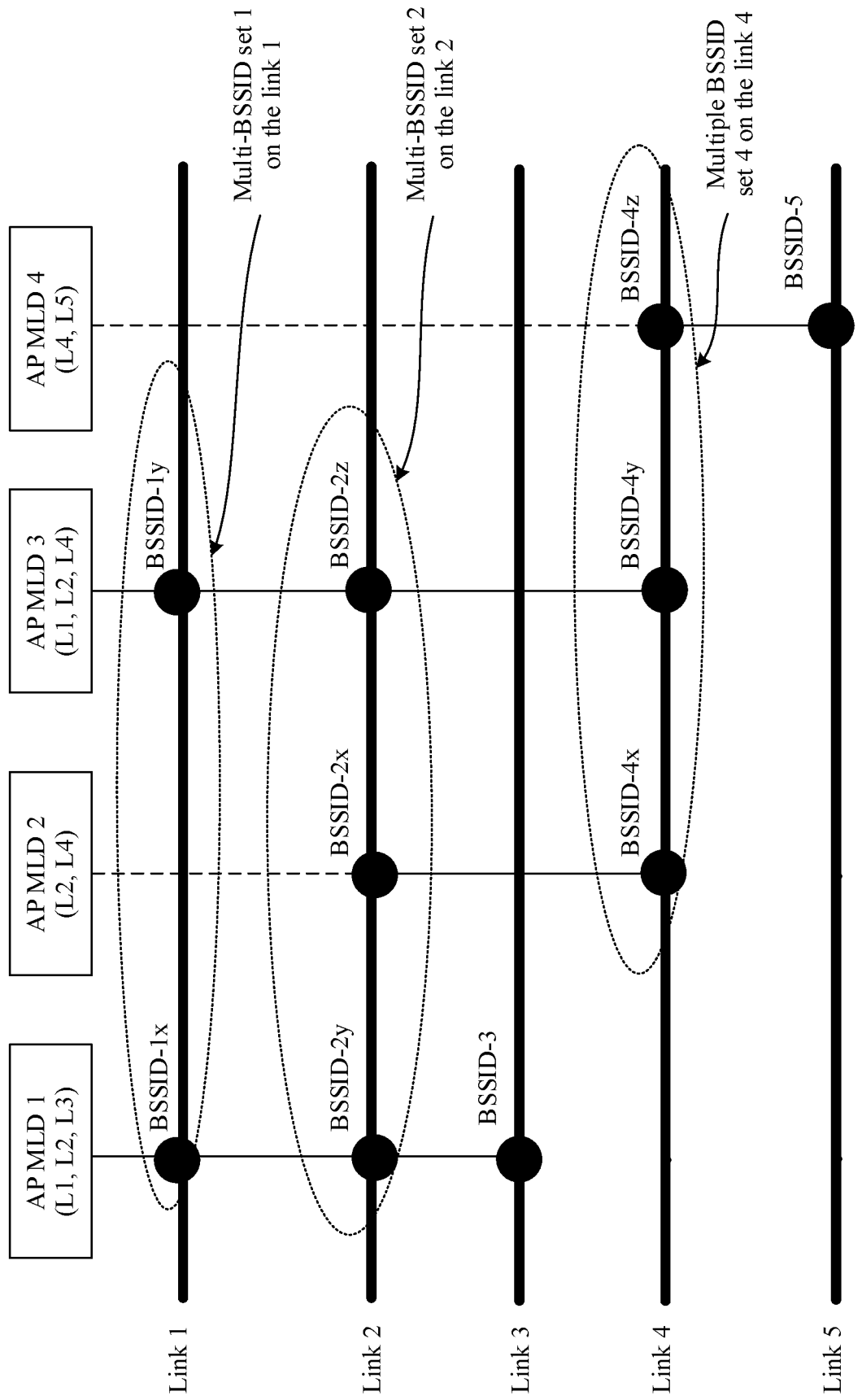
FIG. 12 is a schematic diagram of a structure of a multi-link device according to an embodiment of this application.

For example, as shown in FIG. 12, a multiple BSSID set 1 may include a BSSID-1$x$ and a BSSID-1$y$; a multiple BSSID set 2 may include a BSSID-2$y$, a BSSID-2$x$, and a BSSID-2$z$; a multiple BSSID set 4 may include a BSSID-4$x$, a BSSID-4$y$, and a BSSID-4$z$. For a link 1, that an AP-1$x$ (BSSID-1$x$) sends a beacon frame is used as an example. The first AP multi-link device may be an AP MLD 1, and the second AP multi-link device may be an AP MLD 3. For a link 2, that an AP-2$x$ (BSSID-2$x$) sends a beacon frame is used as an example. The first AP multi-link device may be an AP MLD 2, and second AP multi-link devices may be an AP MLD 1 and the AP MLD 3. For a link 4, that an AP-4$x$ (BSSID-4$x$) sends a beacon frame is used as an example. The first AP multi-link device may be the AP MLD 2, and second AP multi-link devices may be the AP MLD 3 and an AP MLD 4.

For example, when another AP in the second AP multi-link device has performed a channel switch, the second indication information may be set to a first value, for example, 1. Otherwise, the second indication information is set to a second value, for example, 0. It should be noted that, if the second indication information is set to the first value, the value needs to be maintained until a next DTIM beacon frame (a DTIM beacon frame with a non-transmitted BSSID). After the DTIM beacon frame, the first indication information is reset to the second value.

Optionally, the non-transmitted BSSID field further includes second critical update flag signaling.

The second critical update flag signaling may indicate whether a critical parameter update value of an AP in the second AP multi-link device changes.

For example, when any event in a critical BSS parameter event corresponding to one AP in the second AP multi-link device occurs, the first AP adjusts a value of a critical parameter update value of the AP. When the critical parameter update value of one AP in the second AP multi-link device changes, the first AP adjusts the second critical update flag signaling.

For example, each time a critical BSS parameter event of any AP occurs, a critical parameter update value of the AP is increased by 1.

For another example, when a value of a critical parameter update value of any AP in the second AP multi-link device changes, the second critical update flag signaling may be set to the first value, for example, 1; otherwise, the second critical update flag signaling is set to the second value, for example, 0. It should be noted that, if the second critical update flag signaling is set to the first value, the value needs to be maintained until a next DTIM beacon frame (a DTIM beacon frame with a non-transmitted BSSID). After the DTIM beacon frame, the second critical update flag signaling is reset to the second value.

As shown in FIG. 3, the critical parameter update value is located in a BSS parameter change count field in an MLD parameter field in the RNR element.

For example, the first AP may carry, in an MLD parameter field in the RNR element of the management frame shown in FIG. 3, critical parameter update values of other APs in the second AP multi-link device other than a non-transmitted AP that is located in the same multiple BSSID set as the first AP. The first AP may further carry, in the common information field in the multi-link element shown in FIG. 9, a critical parameter update value of the non-transmitted AP that is in the second AP multi-link device and that is in the same multiple BSSID set as the first AP.

For the second AP multi-link device, a value of a critical parameter update value of another AP does not change regardless of whether a management frame sent by the other AP includes an element related to a channel switch. In other words, a value of the first critical update flag signaling does not change regardless of whether a management frame sent by another AP includes an element related to a channel switch.

Whether the management frame sent by the other AP includes the element related to the channel switch may also be described as whether the other AP is performing the channel switch. In other words, whether the other AP is performing a channel switch or not does not cause the value of the critical parameter update value of the other AP to change, that is, whether the other AP is performing the channel switch or not does not cause the value of the first critical update flag signaling to change.

Further, before a channel switch target time point, an RNR element in a management frame sent by the first AP may further include channel information of an AP that is in the second AP multi-link device and that has performed a channel switch, and the channel information includes a working operating class and a channel number of the AP (that is, an operating class and a channel number that are before the channel switch) before the time point. After the channel switch target time point, an RNR element in a management frame sent by the first AP includes channel information of the AP (a reported neighbor AP) that is in the second AP multi-link device and that has performed the channel switch, where the channel information includes a working operating class and a channel number of the AP (that is, an operating class and a channel number after the channel switch) after the time point.

When sending the management frame, the first AP may carry the second indication information to indicate whether the other AP in the second AP multi-link device has performed the channel switch. In this way, the first STA that is associated with the first AP and belongs to a non-AP MLD determines, based on the second indication information, whether the other AP in the second AP multi-link device has performed the channel switch. If the other AP in the second AP multi-link device has performed the channel switch, the STA obtains channel switch information of the AP that has performed the channel switch. Therefore, a STA (even if the STA is in a doze state) that belongs to the same non-AP MLD and that is associated with the AP that has performed the channel switch learns that the AP associated with the STA has performed the channel switch and learns of the channel switch information after the channel switch.

Compared with the method shown in FIG. 8 to FIG. 12 in which the first indication information indicates whether another AP in the first AP multi-link device has performed a channel switch, and the first critical update flag signaling indicates whether a critical parameter update value of an AP in the first AP multi-link device has changed, the first critical update flag signaling in embodiments of this application may be further redefined. To be specific, the first critical update flag signaling is redefined as indicating whether a critical parameter update value of an AP in the first AP multi-link device changes or whether another AP in the first AP multi-link device has performed a channel switch.

For example, when a critical parameter update value of an AP in the first AP multi-link device changes, the first critical update flag signaling may be set to a first value, for example, 1; or when another AP in the first AP multi-link device has performed a channel switch, the first critical update flag signaling may be set to a first value, for example, 1; or when a critical parameter update value of an AP in the first AP multi-link device changes and a channel of another AP in the first AP multi-link device has changed, the first critical update flag signaling may be set to a first value, for example, 1. Otherwise, the first critical update flag signaling is set to a second value, for example, 0. It should be noted that, if the first critical update flag signaling is set to the first value, the value needs to be maintained until a next DTIM beacon frame. After the DTIM beacon frame, the first critical update flag signaling is reset to the second value.

Alternatively, the first critical update flag signaling may be redefined as indicating that channel information that is in the RNR element and that is related to another AP in the first AP multi-link device is changed, or indicating that a critical parameter update value of the other AP is changed, or indicating that a critical parameter update value of the first AP is changed.

For example, when the first critical update flag signaling indicates the channel information that is in the RNR element and that is of another AP in the first AP multi-link device, the first critical update flag signaling may be set to a first value, for example, 1; or when a critical parameter update value of another AP in the first AP multi-link device has changed, the first critical update flag signaling may be set to a first value, for example, 1; or when the critical parameter update value of the first AP has changed, the first critical update flag signaling may be set to a first value, for example, 1. Otherwise, the first critical update flag signaling is set to a second value, for example, 0. It should be noted that, if the first critical update flag signaling is set to the first value, the value needs to be maintained until a next DTIM beacon frame. After the DTIM beacon frame, the first critical update flag signaling is reset to the second value.

Alternatively, the first critical update flag signaling may be redefined as indicating that information (for example, including one or more of channel information, a critical parameter update value, and a link identifier) that is about another AP in the first AP multi-link device and that is in the RNR element is changed, or indicating that information (for example, including one or more of a critical parameter update value and a link identifier) about the first AP is changed. It may also be described as that the first critical update flag signaling is redefined as indicating that information about another AP in the first AP multi-link device is changed (or described as reconfiguration of the information about the other AP in the first AP multi-link device), or indicating that a critical parameter update value of the other AP is changed, or indicating that a critical parameter update value of the first AP is changed.

It should be noted that the information (or described as reconfiguration information) about the other AP in the first AP multi-link device may be carried in the management frame, and the management frame carries the RNR element.

A link identifier of one AP in the first AP multi-link device may be reconfigured, for example, a link identifier of the AP is changed. Certainly, the first critical update flag signaling may be other independent signaling, and is carried in a beacon frame, a probe response frame, or another management frame, for example, a capability information field. In this case, the independent signaling no longer includes a change in a critical parameter update value in the information about another AP in the first AP multi-link device, and no longer includes a change in the information about the first AP. In other words, a meaning of the existing first critical update flag signaling is not included.

A change (or referred to as reconfiguration) of information about an AP in the first AP multi-link device may be understood as one or more of the following.

1. One or more APs are removed from the first multi-link device.

For example, information about the AP does not appear in the RNR element, and this includes a case in which a link identifier in the information about the AP is removed. For details, refer to information shown in FIG. 2 and FIG. 3. This belongs to a type of change in the information about the AP.

2. One or more APs are added to the first multi-link device.

For example, information about the AP is newly added to the RNR element, and this includes a case in which a link identifier in the information about the AP is added. For details, refer to information shown in FIG. 2 and FIG. 3. This belongs to a type of change in the information about the AP.

3. A status change between a disable (disable)/enable (enable) state that one or more APs in the first multi-link device are in belongs to a type of change in information about the AP.

For example, 1-bit information signaling included in the information about the AP indicates whether the AP is in a disable state or an enable state.

(1) The 1-bit information may be in the MLD parameter field in the RNR element, and more specifically, in a link identifier field of the MLD parameter field. The link identifier field includes a 4-bit link identifier and a 1-bit information signaling field, where the 1-bit information signaling field indicates whether the reported AP is in the enable state or the disable state. The 1-bit information signaling field is set to a first value, for example, 0, to indicate that the reported AP is in an enable state; the 1-bit information signaling field is set to a second value, for example, 1, to indicate that the reported AP is in a disable state. Alternatively, the 1-bit information signaling field is set to a first value, for example, 1, to indicate that the reported AP is in the enable state; the 1-bit information signaling field is set to a second value, for example, 0, to indicate that the reported AP is in the disable state. Because the MLD parameter field is newly added in the 802.11be standard, a legacy station cannot identify the newly added MLD parameter field, and therefore cannot learn of its meaning.

Alternatively: (2) The 1-bit information may be in a TBTT information field type in a TBTT information header field in the RNR element. For example, if a TBTT information field type field is set to "0", the AP is in the enable state; if the TBTT information field type field is set to another value, for example, "1", the AP is in the disable state. It should be noted that, currently, in the RNR element, only the value of 0 is used for the 2-bit TBTT information field type field, and the other three values are not used or reserved. In this case, the TBTT information field type field is set another value to indicate that the reported AP is in the disable state. The value of "0" is still reserved to indicate that the reported AP is in the enable state. In this way, a conventional station does not identify the information about the reported AP. The conventional station does not scan the reported AP or associate with the reported AP. This resolves a problem of legacy stations. The legacy station includes an unassociated station, and certainly also includes an associated station.

Alternatively: (3) The 1-bit information may be in a reserved field in a TBTT information header field in the RNR element. The 1-bit information is set to a first value, for example, 0, to indicate that the reported AP is in the enable state; the 1-bit information is set to a second value, for example, 1, to indicate that the reported AP is in the disable state. Alternatively, the 1-bit information is set to a first value, for example, 1, to indicate that the reported AP is in the enable state; the 1-bit information is set to a second value, for example, 0, to indicate that the reported AP is in the disable state. According to this method, the legacy station does not identify the information about the reported AP. Therefore, the legacy station does not scan the reported AP or associate with the reporting AP. This resolves a problem of legacy stations. The legacy station includes an unassociated station, and certainly also includes an associated station.

Certainly, the methods (1), (2), and (3) are all applicable to a new-generation 802.11be station or a next-generation station.

4. An operating link (for example, a corresponding channel number or operating class) of one or more APs in the first multi-link device is changed.

For example, channel information including a channel number and/or an operating class of the AP is changed. Optionally, that a link identifier of the AP is changed is further included. This belongs to a type of change in information about the AP.

For example, when the first critical update flag signaling indicates information (for example, including channel information, a critical parameter update value, and a link identifier) about another AP in the first AP multi-link device in the RNR element, the first critical update flag signaling may be set to a first value, for example, 1; or when information (for example, including a critical parameter update value and a link identifier) about the first AP has changed, the first critical update flag signaling may be set to a first value, for example, 1. Otherwise, the first critical update flag signaling is set to a second value, for example, 0. It should be noted that, if the first critical update flag signaling is set to the first value, the value needs to be maintained until a next DTIM beacon frame. After the DTIM beacon frame, the first critical update flag signaling is reset to the second value.

Based on the foregoing redefinition of the first critical update flag signaling, when a critical parameter update value of an AP in the first AP multi-link device changes or another AP in the first AP multi-link device has performed a channel switch, the first STA may further parse the RNR element in the management frame in which the first critical update flag signaling is located, to further determine whether the other AP in the first AP multi-link device has performed the channel switch. If the other AP has performed the channel switch, the STA obtains channel switch information of the AP that has performed the channel switch, so that a STA that belongs to the same STA multi-link device as the first STA and that is associated with the AP that has performed the channel switch obtains the channel switch information. The first STA may further parse the management frame to determine whether a critical parameter update value of an AP changes. Alternatively, after receiving the management frame that includes the first critical update flag signaling and that is sent by the first AP, the first STA may parse the management frame. Based on the first critical update flag signaling in the management frame, the STA multi-link device may obtain changed information of another AP, or a changed critical parameter update value of the other AP, or a changed critical parameter update value of the first AP.

Further, similar to the foregoing redefinition of the first critical update flag signaling, the foregoing second critical update flag signaling may also be redefined. In other words, the second critical update flag signaling indicates whether a critical parameter update value of an AP in the second AP multi-link device changes or whether another AP in the second AP multi-link device has performed a channel switch.

For example, when a critical parameter update value of an AP in the second AP multi-link device changes, the second critical update flag signaling may be set to a first value, for example, 1; or when another AP in the second AP multi-link device has performed a channel switch, the second critical update flag signaling may be set to a first value, for example, 1; or when a critical parameter update value of an AP in the second AP multi-link device changes and a channel of another AP in the second AP multi-link device has changed, the second critical update flag signaling may be set to a first value, for example, 1. Otherwise, the second critical update flag signaling is set to a second value, for example, 0. It should be noted that, if the second critical update flag signaling is set to the first value, the value needs to be maintained until a next DTIM beacon frame. After the DTIM beacon frame, the second critical update flag signaling is reset to the second value.

Alternatively, the second critical update flag signaling may be redefined as indicating that channel information that is in the RNR element and that is related to another AP in the second AP multi-link device other than a transmitted AP is changed, or indicating that a critical parameter update value of the other AP is changed, or indicating that a critical parameter update value of a non-transmitted AP is changed.

For example, when the second critical update flag signaling indicates the channel information that is in the RNR element and that is of another AP in the second AP multi-link device other than the transmitted AP, the second critical update flag signaling may be set to a first value, for example, 1; or when a critical parameter update value of another AP in the second AP multi-link device has changed, the second critical update flag signaling may be set to a first value, for example, 1; or when a critical parameter update value of a non-transmitted AP in the second AP multi-link device has changed, the second critical update flag signaling may be set to a first value, for example, 1. Otherwise, the second critical update flag signaling is set to a second value, for example, 0. It should be noted that, if the second critical update flag signaling is set to the first value, the value needs to be maintained until a next DTIM beacon frame. After the DTIM beacon frame, the second critical update flag signaling is reset to the second value.

Alternatively, the second critical update flag signaling may be redefined as indicating that information (for example, including one or more of channel information, a critical parameter update value, and a link identifier) that is about another AP in the second AP multi-link device other than a transmitted AP and that is in the RNR element is changed, or indicating that information (for example, including one or more of a critical parameter update value and a link identifier) about a non-transmitted AP is changed. It may also be described as that the second critical update flag signaling is redefined as indicating that information about another AP in the second AP multi-link device other than a transmitted AP is changed (or described as reconfiguration of the information about the other AP in the second AP multi-link device other than the transmitted AP), or indicating that a critical parameter update value of the other AP is changed, or indicating that a critical parameter update value of a non-transmitted AP is changed. It should be noted that the information (or described as reconfiguration information) about the other AP in the second AP multi-link device other than the transmitted AP may be carried in the management frame, and the management frame carries the RNR element.

Certainly, the second critical update flag signaling may be other independent signaling, and is carried in a beacon frame, a probe response frame, or another management frame, for example, is located in a non-transmitted BSSID capability information field (in a non-transmitted BSSID capability field in a non-transmitted BSSID capability element in a multiple BSSID element). In this case, the independent signaling no longer includes a change in a critical parameter update value in the information about another AP in the second AP multi-link device, and no longer includes a change in the information about a second AP. In other words, a meaning of the existing second critical update flag signaling is not included.

A change (or referred to as reconfiguration) of information about an AP in the second AP multi-link device may be understood as one or more of the following.

1. One or more APs are removed from the second multi-link device.

For example, information about the AP does not appear in the RNR element, and this includes a case in which a link identifier in the information about the AP is removed. For details, refer to information shown in FIG. 2 and FIG. 3. This belongs to a type of change in the information about the AP.

2. One or more APs are added to the second multi-link device.

For example, information about the AP is newly added to the RNR element, and this includes a case in which a link identifier in the information about the AP is added. For details, refer to information shown in FIG. 2 and FIG. 3. This belongs to a type of change in the information about the AP.

3. A status change between a disable (disable)/enable (enable) state that one or more APs in the second multi-link device are in belongs to a type of change in information about the AP.

For example, 1-bit information signaling included in the information about the AP indicates whether the AP is in a disable state or an enable state.

(1) The 1-bit information may be in the MLD parameter field in the RNR element, and more specifically, in a link identifier field of the MLD parameter field. The link identifier field includes a 4-bit link identifier and a 1-bit information signaling field, where the 1-bit information signaling field indicates whether the reported AP is in the enable state or the disable state. The 1-bit information signaling field is set to a first value, for example, 0, to indicate that the reported AP is in an enable state; the 1-bit information signaling field is set to a second value, for example, 1, to indicate that the reported AP is in a disable state. Alternatively, the 1-bit information signaling field is set to a first value, for example, 1, to indicate that the reported AP is in the enable state; the 1-bit information signaling field is set to a second value, for example, 0, to indicate that the reported AP is in the disable state. Because the MLD parameter field is newly added in the 802.11be standard, a legacy station cannot identify the newly added MLD parameter field, and therefore cannot learn of its meaning.

Alternatively: (2) The 1-bit information may be in a TBTT information field type in a TBTT information header field in the RNR element. For example, if a TBTT information field type field is set to "0", the AP is in the enable state; if the TBTT information field type field is set to another value, for example, "1", the AP is in the disable state. It should be noted that, currently, in the RNR element, only the value of 0 is used for the 2-bit TBTT information field type field, and the other three values are not used or reserved. In this case, the TBTT information field type field is set another value to indicate that the reported AP is in the disable state. The value of "0" is still reserved to indicate that the reported AP is in the enable state. In this way, a conventional station does not identify the information about the reported AP. The conventional station does not scan the reported AP or associate with the reported AP. This resolves a problem of legacy stations. The legacy station includes an unassociated station, and certainly also includes an associated station.

Alternatively: (3) The 1-bit information may be in a reserved field in a TBTT information header field in the RNR element. The 1-bit information is set to a first value, for example, 0, to indicate that the reported AP is in the enable state; the 1-bit information is set to a second value, for example, 1, to indicate that the reported AP is in the disable state. Alternatively, the 1-bit information is set to a first value, for example, 1, to indicate that the reported AP is in the enable state; the 1-bit information is set to a second value, for example, 0, to indicate that the reported AP is in the disable state. According to this method, the legacy station does not identify the information about the reported AP. Therefore, the legacy station does not scan the reported AP or associate with the reporting AP. This resolves a problem of legacy stations. The legacy station includes an unassociated station, and certainly also includes an associated station.

Certainly, the methods (1), (2), and (3) are all applicable to a new-generation EHT station or a next-generation station.

4. An operating link (for example, a corresponding channel number or operating class) of one or more APs in the second multi-link device is changed.

For example, channel information including a channel number and/or an operating class of the AP is changed. Optionally, that a link identifier of the AP is changed is further included. This belongs to a type of change in information about the AP.

For example, when the second critical update flag signaling indicates information (for example, including channel information, a critical parameter update value, and a link identifier) about another AP in the second AP multi-link device other than a transmitted AP in the RNR element, the second critical update flag signaling may be set to a first value, for example, 1; or when information (for example, including a critical parameter update value and a link identifier) about a non-transmitted AP has changed, the second critical update flag signaling may be set to a first value, for example, 1. Otherwise, the second critical update flag signaling is set to a second value, for example, 0. It should be noted that, if the second critical update flag signaling is set to the first value, the value needs to be maintained until a next DTIM beacon frame. After the DTIM beacon frame, the second critical update flag signaling is reset to the second value.

Based on the foregoing redefinition of the second critical update flag signaling, when a critical parameter update value of an AP in the second AP multi-link device changes or another AP in the second AP multi-link device has performed a channel switch, the first STA may further parse the RNR element in the management frame in which the second critical update flag signaling is located, to further determine whether the other AP in the second AP multi-link device has performed the channel switch. If the other AP has performed the channel switch, the STA obtains channel switch information of the AP that has performed the channel switch, so that a STA that belongs to the same STA multi-link device as the first STA and that is associated with the AP that has performed the channel switch obtains the channel switch information. The first STA may further parse the management frame to determine whether a critical parameter update value of an AP changes. Alternatively, after receiving the management frame that includes the second critical update flag signaling and that is sent by the first AP, the first STA may parse the management frame. Based on the second critical update flag signaling in the management frame, the STA multi-link device may obtain changed information of another AP, or a changed critical parameter update value of the other AP, or a changed critical parameter update value of a non-transmitted AP.

Figure 13:
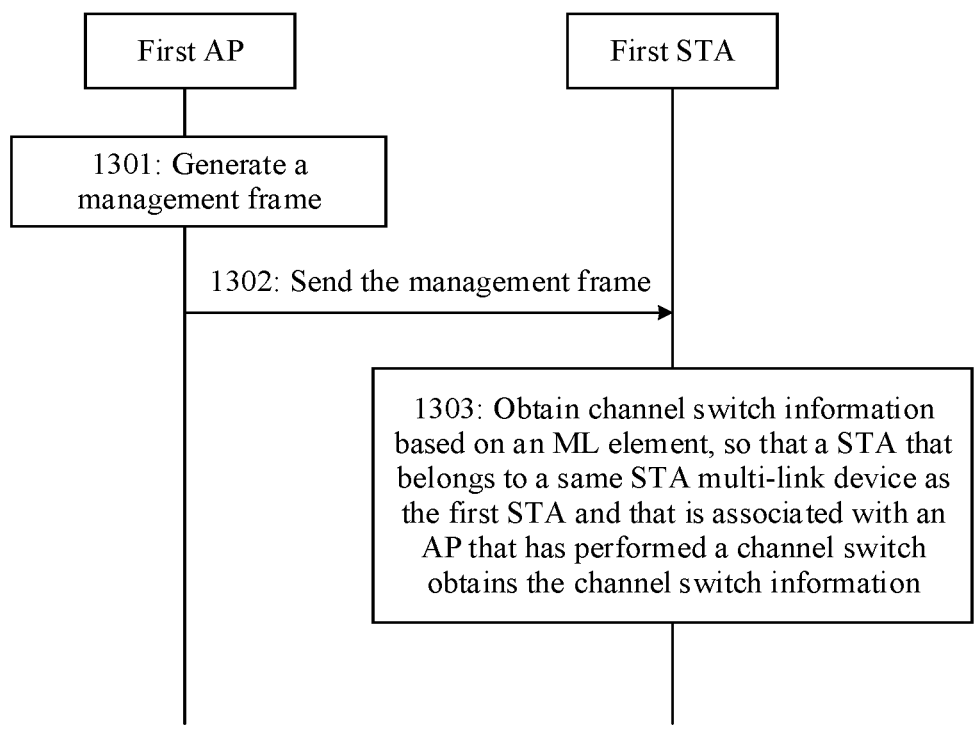
FIG. 13 is a flowchart of a communication method according to an embodiment of this application.

Corresponding to that whether an AP has performed a channel switch is determined based on the first indication information, as shown in FIG. 13, an embodiment of this application further provides a communication method. As shown in FIG. 13, the method may include the following steps.

Step 1301: A first AP generates a management frame.

The management frame may include a multi-link (multi-link, ML) element. After another AP in a first AP multi-link device performs a channel switch, the ML element may include channel switch information of the AP that has performed the channel switch, and the ML element is up to a next delivery DTIM beacon frame sent by the first AP. Alternatively, after an AP in a first AP multi-link device including the first AP has performed a channel switch, the ML element may include channel switch information of the AP that has performed the channel switch, and the ML element is up to a next delivery DTIM beacon frame sent by the first AP.

The following uses an example in which after the other AP in the first AP multi-link device has performed the channel switch, the ML element may include the channel switch information of the AP that has performed the channel switch, and the ML element is up to the next delivery DTIM beacon frame sent by the first AP. It may be understood that the following embodiment is also applicable to a case in which after the AP in the first AP multi-link device including the first AP has performed the channel switch, the ML element may include the channel switch information of the AP that has performed the channel switch, and the ML element is up to the next delivery DTIM beacon frame sent by the first AP.

Figure 14:
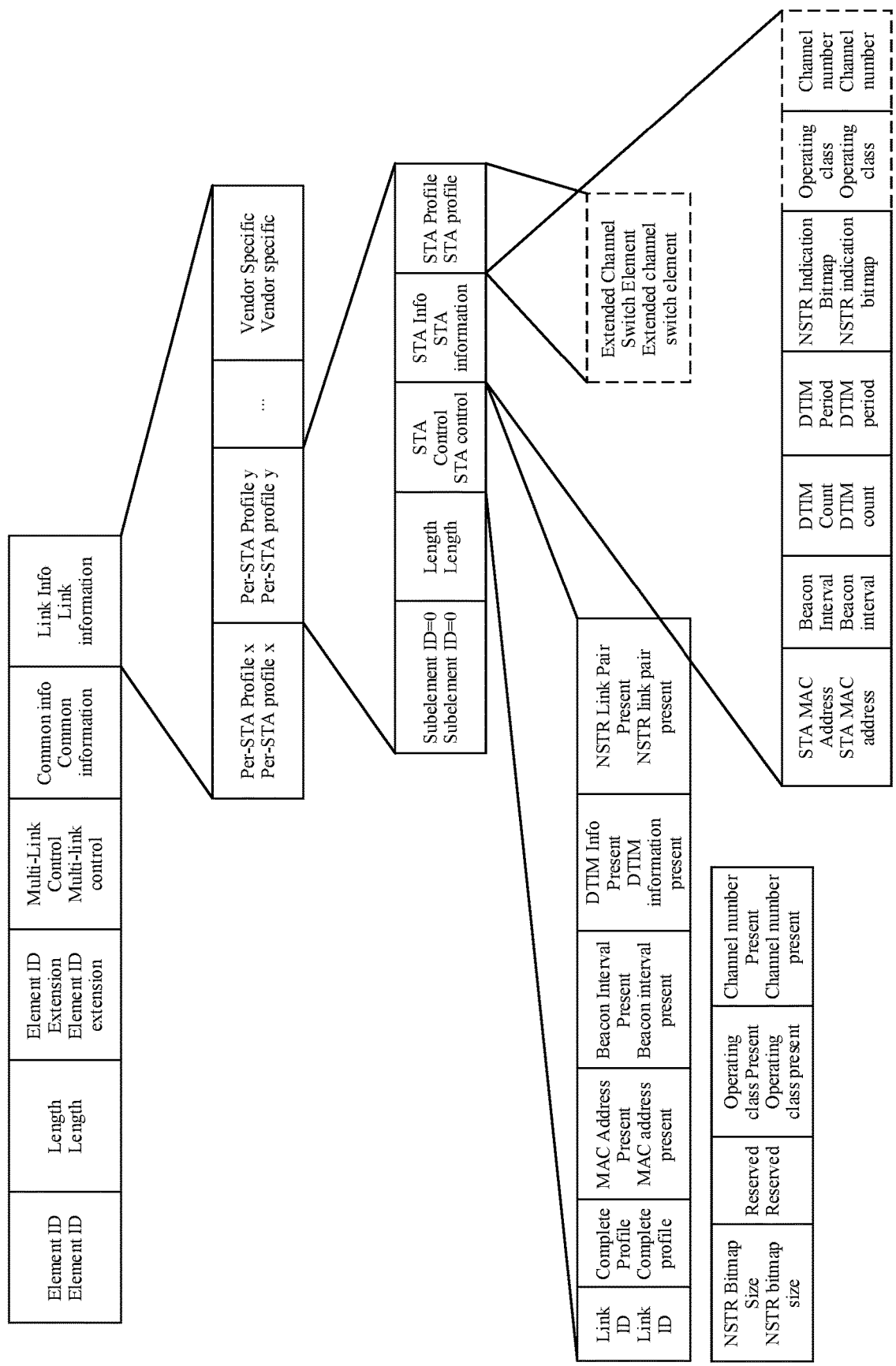
FIG. 14 is a schematic diagram of a frame format of an ML element according to an embodiment of this application.

For example, as shown in FIG. 14, the ML element may include an element ID (identifier) field, a length field, an element ID extension field, a multi-link control field, a common information field, and a link information field.

The link information field may include several per-STA profile fields. Each per-STA profile field may include a sub-element ID field, a length field, a STA control field, a STA information field, and a STA profile field.

It should be noted that an extended channel switch element in a STA profile field and an operating class field and a channel number field in a STA information field in FIG. 14 separately correspond to the following two possible designs, and do not appear at the same time. Details are as follows.

In a possible design, the channel switch information is an element related to the channel switch, and the first AP adds the element related to the channel switch to the STA profile field in the ML element.

The element related to the channel switch may include a channel switch element or an extended channel switch element that is used to indicate, until a next DTIM beacon frame, that a reported AP has performed a channel switch.

The element related to the channel switch further includes a channel switch count field. The channel switch count field indicates a quantity of TBTTs before a station that sends the channel switch element or sends the extended channel switch element switches to a new channel, or switches to a new operating class and a new channel. When a value of the channel switch count field is a first value, for example, 1, the channel switch count field may indicate that the channel switch occurs immediately before a next target beacon transmission time. When a value of the channel switch count field is a second value, for example, 0, the channel switch count field may indicate that the channel switch occurs at any time after the management frame is sent or indicate that the channel switch has occurred.

For example, when another AP in the first AP multi-link device performs a channel switch, and after the AP completes the channel switch, when the first AP sends a management frame, an element related to the channel switch of the AP that performs the channel switch is still carried in the STA profile field in the ML element in the management frame until a next DTIM beacon frame, so that a first STA obtains, based on the management frame, the element related to the channel switch of the AP that has performed the channel switch. Therefore, a STA that belongs to a same STA multi-link device with the first STA and that is associated with the AP that has performed the channel switch obtains the element related to the channel switch. In this case, in the element related to the channel switch, the value of the channel switch count field may be the second value, for example, 0, to indicate that the channel switch occurs at any time after the management frame is sent or that the channel switch has occurred.

In still another possible design, the channel switch information is channel information, and the first AP carries the channel information in the STA information field in the ML element.

The channel information may include an operating class and a channel number; or the channel information may include a channel number.

For example, when another AP in the first AP multi-link device has performed a channel switch, and after the AP completes the channel switch, when the first AP sends a management frame, channel information of the AP that performs the channel switch is still carried in the STA information field in the ML element in the management frame until a next DTIM beacon frame, so that a first STA obtains, based on the management frame, the channel information of the AP that has performed the channel switch. Therefore, a STA that belongs to a same STA multi-link device with the first STA and that is associated with the AP that has performed the channel switch obtains the channel information.

Step 1302: The first AP sends the management frame to a first station STA. Correspondingly, the first STA receives the management frame.

Step 1303: The first STA obtains channel switch information based on the ML element, so that a STA that belongs to a same STA multi-link device as the first STA and that is associated with an AP that performs a channel switch obtains the channel switch information.

In a possible design, the first STA parses the STA profile field in the ML element in the management frame (for example, a DTIM beacon frame), to obtain the element related the channel switch of the AP, in the first AP multi-link device, that has performed the channel switch. In this way, the STA that belongs to the same STA multi-link device as the first STA and that is associated with the AP that has performed the channel switch obtains the element related to the channel switch. In this case, in the element related to the channel switch, the value of the channel switch count field may be the second value, to indicate that the channel switch occurs at any time after the management frame is sent or that the channel switch has occurred.

In another possible design, the first STA parses the STA information field in the ML element in the management frame (for example, a DTIM beacon frame), to obtain the channel information of the AP, in the first AP multi-link device, that has performed the channel switch. In this way, the STA that belongs to the same STA multi-link device as the first STA and that is associated with the AP that has performed the channel switch obtains the channel information.

Figure 15:
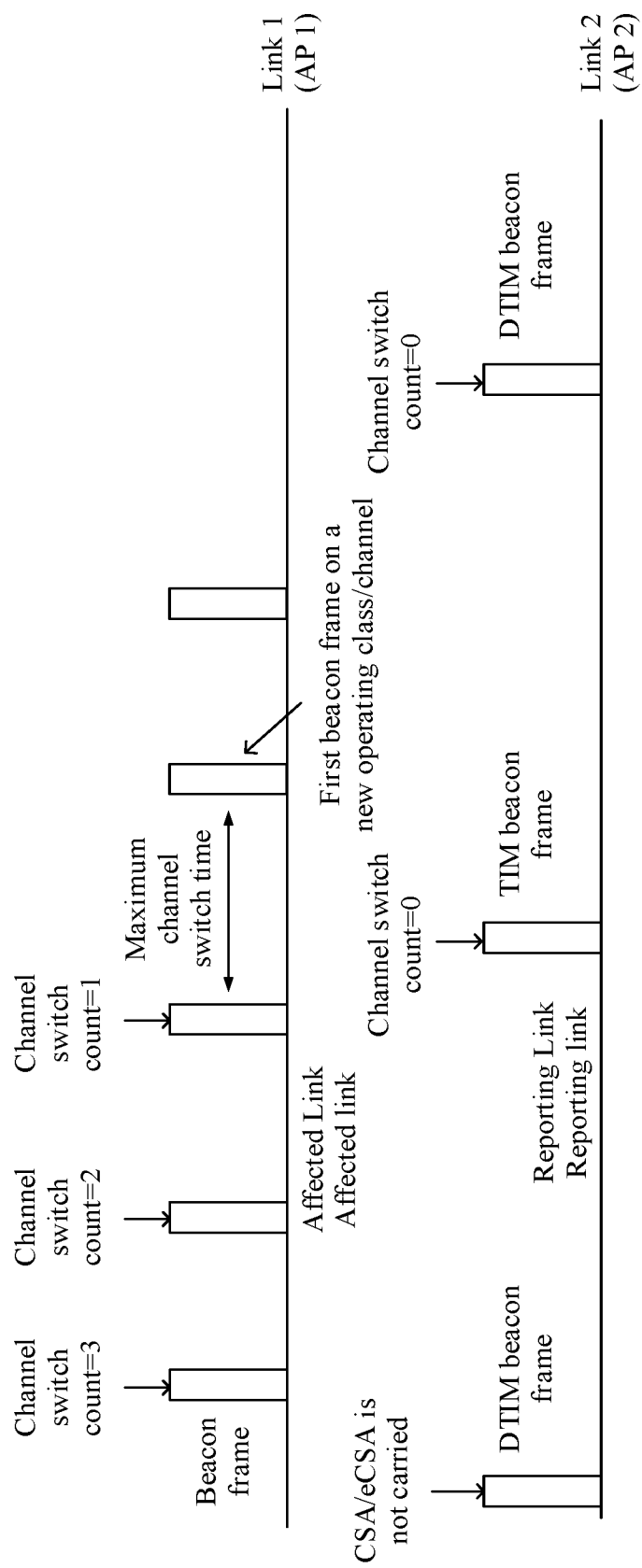
FIG. 15 is a diagram of a signal time sequence according to an embodiment of this application.

For example, as shown in FIG. 15, the STA multi-link device includes a STA 1 and a STA 2, and establishes a multi-link connection to the first AP multi-link device, where the STA 1 and the STA 2 are respectively associated with an AP 1 and an AP 2 in the first AP multi-link device. It is assumed that the STA 1 is in a doze state, the STA 2 observes a link 2 on which the STA 2 operates, and the STA 2 wakes up only at a time point of a DTIM beacon frame on the link 2. After the AP 1 performs a channel switch, because an interval between beacon frames sent by the AP 2 on the link 2 is large, the AP 2 may carry the channel switch information in ML elements in a second beacon frame and a third beacon frame (which are respectively a first TIM beacon frame and a second DTIM beacon frame in FIG. 15) on the link 2. The STA 2 may parse the ML element in the DTIM beacon frame received on the link 2, to learn that the AP 1 on the link 1 has performed the channel switch, and learns of the channel switch information. In this way, the STA 1 associated with the AP 1 obtains the channel switch information of the AP 1, thereby ensuring that the STA 1 can normally communicate with the AP 1.

Optionally, if the first AP is in a multiple BSSID set, and the first AP is a transmitted AP, the ML element in the sent management frame may further include channel switch information of another AP, in a second AP multi-link device, that has performed a channel switch, and the ML element is up to that the first STA receives a next DTIM beacon frame sent by the first AP.

The other AP in the second AP multi-link device may be another AP in the second multi-link device other than a transmitted AP.

In a possible design, when another AP in the second AP multi-link device performs a channel switch, and after the AP completes the channel switch, when the first AP sends a management frame, an element related to the channel switch of the AP, in the second AP multi-link device, that performs the channel switch is still carried in the STA profile field in the ML element in the management frame until a next DTIM beacon frame, so that a first STA obtains, based on the management frame, the element related to the channel switch of the AP that has performed the channel switch. Therefore, a STA that belongs to a same STA multi-link device with the first STA and that is associated with the AP that has performed the channel switch obtains the element related to the channel switch. In this case, in the element related to the channel switch, the value of the channel switch count field may be the second value, to indicate that the channel switch occurs at any time after the management frame is sent or that the channel switch has occurred.

In another possible design, when another AP in the second AP multi-link device has performed a channel switch, and after the AP completes the channel switch, when the first AP sends a management frame, channel information of the AP, in the second AP multi-link device, that performs the channel switch is still carried in the STA information field in the ML element in the management frame until a next DTIM beacon frame, so that a first STA obtains, based on the management frame, the channel information of the AP that has performed the channel switch. Therefore, a STA that belongs to a same STA multi-link device with the first STA and that is associated with the AP that has performed the channel switch obtains the channel information.

Based on the method shown in FIG. 13, when the first AP sends the management frame, the ML element in the management frame carries the channel switch information of the AP that has performed the channel switch in the first AP multi-link device or the second AP multi-link device. In this way, the first STA associated with the first AP can determine, based on the ML element, the channel switch information of the AP that has performed the channel switch. Further, the STA that belongs to the same STA multi-link device as the first STA and that is associated with the AP that has performed the channel switch learns that the AP associated with the STA has performed the channel switch, and learns of the channel switch information after the channel switch.

The foregoing mainly describes the solutions provided in embodiments of this application from the perspective of interaction between the devices. It may be understood that to implement the foregoing functions, the devices include hardware structures and/or software modules corresponding to the functions. A person of ordinary skill in the art should easily be aware that, in combination with algorithms and steps in the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, each device may be divided into functional modules based on the foregoing method examples. For example, functional modules corresponding to various functions may be obtained through division, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 16:
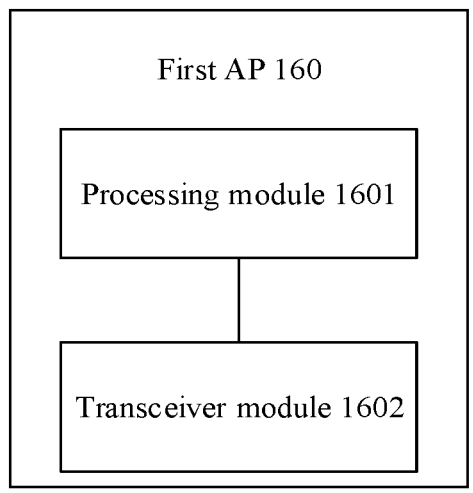
FIG. 16 is a schematic diagram of a structure of a first AP according to an embodiment of this application.

FIG. 16 shows a first AP when each function module is obtained through division based on each corresponding function. The first AP 160 may include a processing module 1601 and a transceiver module 1602. For example, the first AP 160 may be the first AP, or may be a chip used in the first AP or another combination component, part, or the like that has a function of the first AP. When the first AP 160 is the first AP, the processing module 1601 may be a processor (or a processing circuit), for example, a baseband processor. The baseband processor may include one or more CPUs. The transceiver module 1602 may be a transceiver. The transceiver may include an antenna, a radio frequency circuit, and the like. When the first AP 160 is a component having a function of the first AP, the processing module 1601 may be a processor (or a processing circuit), for example, a baseband processor; and the transceiver module 1602 may be a radio frequency unit. When the first AP 160 is a chip system, the processing module 1601 may be a processor (or a processing circuit) of the chip system, and may include one or more central processing units. The transceiver module 1602 may be an input/output interface of a chip (for example, a baseband chip). It should be understood that the processing module 1601 in this embodiment of this application may be implemented by a processor or a processor-related circuit component (or referred to as a processing circuit); and the transceiver module 1602 may be implemented by a transceiver or a transceiver-related circuit component.

For example, the processing module 1601 may be configured to perform all operations other than receiving and sending operations performed by the first AP in the embodiments shown in FIG. 8 to FIG. 15, and/or configured to support another process of the technology described in this specification. The transceiver module 1602 may be configured to perform all receiving and sending operations performed by the first AP in the embodiments shown in FIG. 8 to FIG. 15, and/or configured to support another process of the technology described in this specification.

In still another possible implementation, the processing module 1601 in FIG. 16 may alternatively be a processor, and a function of the processing module 1601 may be integrated into the processor. The transceiver module 1602 may alternatively be a transceiver, and a function of the transceiver module 1602 may be integrated into the transceiver. Further, the first AP 160 shown in FIG. 16 may further include a memory. When the processing module 1601 is replaced with a processor, and the transceiver module 1602 is replaced with a transceiver, the first AP 160 in this embodiment of this application may be a communication apparatus shown in FIG. 7.

Figure 17:
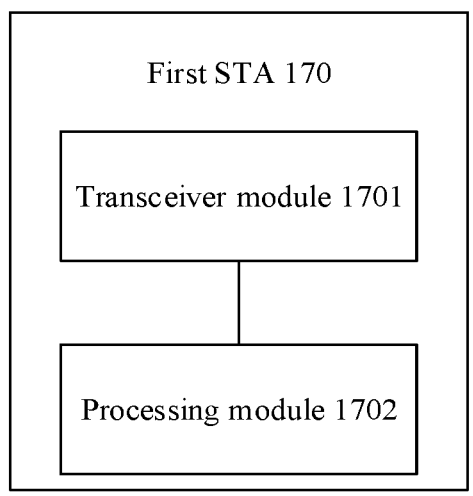
FIG. 17 is a schematic diagram of a structure of a first STA according to an embodiment of this application.

FIG. 17 shows a first STA when each function module is obtained through division based on each corresponding function. The first STA 170 may include a transceiver module 1701 and a processing module 1702. For example, the first STA 170 may be the first STA, or may be a chip used in the first STA or another combination component, part, or the like that has a function of the first STA. When the first STA 170 is the first STA, the transceiver module 1701 may be a transceiver, where the transceiver may include an antenna, a radio frequency circuit, and the like; the processing module 1702 may be a processor (or a processing circuit), for example, a baseband processor, where the baseband processor may include one or more CPUs. When the first STA 170 is a component having a function of the first STA, the transceiver module 1701 may be a radio frequency unit, and the processing module 1702 may be a processor (or a processing circuit), for example, a baseband processor. When the first STA 170 is a chip system, the transceiver module 1701 may be an input/output interface of the chip (for example, a baseband chip), and the processing module 1702 may be a processor (or a processing circuit) of the chip system, and may include one or more central processing units. It should be understood that the transceiver module 1701 in this embodiment of this application may be implemented by a transceiver or a transceiver-related circuit component, and the processing module 1702 may be implemented by a processor or a processor-related circuit component (or referred to as a processing circuit).

For example, the transceiver module 1701 may be configured to perform all receiving and sending operations performed by the first STA in the embodiments shown in FIG. 8 to FIG. 15, and/or configured to support another process of the technology described in this specification. The processing module 1702 may be configured to perform all operations other than the receiving and sending operations performed by the first STA in the embodiments shown in FIG. 8 to FIG. 15, and/or configured to support another process of the technology described in this specification.

In still another possible implementation, the transceiver module 1701 in FIG. 17 may be replaced with a transceiver, and a function of the transceiver module 1701 may be integrated into the transceiver. The processing module 1702 may be replaced with a processor, and a function of the processing module 1702 may be integrated into the processor. Further, the first STA 170 shown in FIG. 17 may further include a memory. When the transceiver module 1701 is replaced with a transceiver, and the processing module 1702 is replaced with a processor, the first STA 170 in this embodiment of this application may be a communication apparatus shown in FIG. 7.

Embodiments of this application further provide a computer-readable storage medium. All or some of the processes in the foregoing method embodiments may be implemented by a computer program instructing related hardware. The program may be stored in the computer-readable storage medium. When the program is executed, the processes of the foregoing method embodiments may be included. The computer-readable storage medium may be an internal storage unit of the terminal (including a data transmit end and/or a data receive end) in any one of the foregoing embodiments, for example, a hard disk drive or a memory of the terminal. Alternatively, the computer-readable storage medium may be an external storage device of the terminal, for example, a plug-in hard disk, a smart media card (smart media card, SMC), a secure digital (secure digital, SD) card, a flash card (flash card), or the like that are configured on the terminal. Further, the computer-readable storage medium may alternatively include both the internal storage unit of the terminal and the external storage device. The computer-readable storage medium is configured to store the computer program and other programs and data that are required by the terminal. The computer-readable storage medium may be further configured to temporarily store data that has been output or is to be output.

It should be noted that, in the specification, claims, and accompanying drawings of this application, terms "first", "second", and the like are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

It should be noted that, in the specification, claims, and accompanying drawings of this application, a name of a field newly provided compared with the 802.11-2016 protocol and the 802.11ax Draft 8.0 protocol may also be another name. This is not limited.

It should be understood that, in this application, "at least one (item)" means one or more, "multiple" or "a plurality of" means two or more, "at least two (items)" means two, three, or more, and "and/or" is used to describe an association relationship between associated objects and indicates that there may be three relationships. For example, "A and/or B" may indicate that only A exists, only B exists, and both A and B exist, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

The foregoing descriptions about implementations allow a person skilled in the art to understand that, for the purpose of convenient and brief description, division of the foregoing functional modules is taken as an example for illustration. During actual application, the foregoing functions can be allocated to different modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or division into the units is merely logical function division and may be other division in actual implementation. For example, multiple units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in embodiments of this application. The foregoing storage medium includes any medium that can store program code, such as a USB flash drive, a removable hard disk, a ROM, a RAM, a magnetic disk, or an optical disc.

What is claimed is:

1. A communication method performed by a first access point (AP), comprising:
   generating a management frame comprising first critical update flag signaling and a critical parameter update value of a second AP of a plurality of second APs; and
   sending the management frame to a first station (STA):
   wherein the critical parameter update value of the second AP is incremented by 1 in response to determining that a critical basic service set (BSS) parameter event of the second AP has occurred;
   wherein the first critical update flag signaling is set to a first value based on:
   at least one of the plurality of second APs being removed from a first AP multi-link device,
   at least one of the plurality of second APs being newly added to the first AP multi-link device,
   a change in a disable/enable state of one or more second APs in the first AP multi-link device, or
   the critical parameter update value of the second AP having changed;
   wherein the first AP and the second AP are both in the first AP multi-link device;
   wherein the management frame further comprises second critical update flag signaling and a critical parameter update value of a third AP of a plurality of third APs;
   wherein the critical parameter update value of the third AP is incremented by 1 in response to determining that a critical BSS parameter event of the third AP has occurred;
   wherein the second critical update flag signaling is set to a first value based on:
   information about at least one of the plurality of third APs in a second AP multi-link device having changed,
   the critical parameter update value of the third AP having changed, or
   a critical parameter update value of a non-transmitted AP in the second AP multi-link device having changed;
   wherein the third AP is not a non-transmitted AP;
   wherein the third AP or the non-transmitted AP in the second AP multi-link device and the first AP belong to a same multiple basic service set identifier (BSSID) set.

2. The method according to claim 1, wherein the first value to which the first critical update flag signaling is set is maintained up to a next delivery traffic indication map (DTIM) beacon frame.

3. The method according to claim 1, wherein the information about the at least one of the plurality of third APs in the second AP multi-link device having changed corresponds to:
   the at least one of the plurality of third APs having been removed from the second AP multi-link device;
   the at least one of the plurality of third APs having been newly added to the second AP multi-link device;
   a change in a disable/enable state of one or more third APs in the second AP multi-link device; or
   a change in an operating link of one or more third APs in the second AP multi-link device.

4. The method according to claim 1, wherein the first value to which the second critical update flag signaling is set is maintained up to a next delivery traffic indication map (DTIM) beacon frame.

5. A first access point (AP), comprising:
   a memory storing executable instructions; a processor configured to execute the executable instructions to perform operations comprising:
   generating a management frame comprising first critical update flag signaling and a critical parameter update value of a second AP of a plurality of second APs; and
   sending the management frame to a first station (STA):
   wherein the critical parameter update value of the second AP is incremented by 1 in response to determining that a critical basic service set (BSS) parameter event of the second AP has occurred;
   wherein the first critical update flag signaling is set to a first value based on:
   at least one of the plurality of second APs being removed from a first AP multi-link device,
   at least one of the plurality of second APs being newly added to the first AP multi-link device,
   a change in a disable/enable state of one or more second APs in the first AP multi-link device, or
   the critical parameter update value of the second AP having changed;
   wherein the first AP and the second AP are both in the first AP multi-link device;
   wherein the management frame further comprises second critical update flag signaling and a critical parameter update value of a third AP of a plurality of third APs;
   wherein the critical parameter update value of the third AP is incremented by 1 in response to determining that a critical BSS parameter event of the third AP has occurred;
   wherein the second critical update flag signaling is set to a first value based on:
   information about at least one of the plurality of third APs in a second AP multi-link device having changed,
   the critical parameter update value of the third AP having changed, or
   a critical parameter update value of a non-transmitted AP in the second AP multi-link device having changed;
   wherein the third AP is not a non-transmitted AP;
   wherein the third AP or the non-transmitted AP in the second AP multi-link device and the first AP belong to a same multiple basic service set identifier (BSSID) set.

6. The first AP according to claim 5, wherein the first value to which the first critical update flag signaling is set is maintained up to a next delivery traffic indication map (DTIM) beacon frame.

7. The first AP according to claim 5, wherein the information about the at least one of the plurality of third APs in the second AP multi-link device having changed corresponds to:
- the at least one of the plurality of third APs having been removed from the second AP multi-link device;
- the at least one of the plurality of third APs having been newly added to the second AP multi-link device;
- a change in a disable/enable state of one or more third APs in the second AP multi-link device; or
- a change in an operating link of one or more third APs in the second AP multi-link device.

8. The method according to claim 5, wherein the first value to which the second critical update flag signaling is set is maintained up to a next delivery traffic indication map (DTIM) beacon frame.

* * * * *

UNITED STATES PATENT AND TRADEMARK OFFICE
CERTIFICATE OF CORRECTION

| | | |
|---|---|---|
| PATENT NO. | : 12,323,865 B2 | Page 1 of 1 |
| APPLICATION NO. | : 18/317092 | |
| DATED | : June 3, 2025 | |
| INVENTOR(S) | : Gan et al. | |

It is certified that error appears in the above-identified patent and that said Letters Patent is hereby corrected as shown below:

On the Title Page

(71) Applicant: "Guangdong (CN)" should read -- Shenzhen (CN) --.

In the Claims

Claim 1: Column 47, Line 32: "sending the management frame to a first station (STA):" should read as -- sending the management frame to a first station (STA); --.

Claim 5: Column 48, Line 28: "sending the management frame to a first station (STA):" should read as -- sending the management frame to a first station (STA); --.

Claim 5: Column 48, Line 35: "at least one of the plurality of second APs being removed" should read as -- at least one of the plurality of second APs having been removed --.

Claim 5: Column 48, Line 37: "at least one of the plurality of second APs being newly" should read as -- at least one of the plurality of second APs having been newly --.

Claim 5: Column 48, Line 61: "wherein the third AP or the non-transmitted AP in the" should read as -- wherein at least one AP in the --.

Signed and Sealed this
Twenty-first Day of October, 2025

John A. Squires
*Director of the United States Patent and Trademark Office*